(12) United States Patent
Stothers et al.

(10) Patent No.: US 8,411,872 B2
(45) Date of Patent: Apr. 2, 2013

(54) ADAPTIVE CONTROL UNIT WITH FEEDBACK COMPENSATION

(75) Inventors: Ian Stothers, Norfolk (GB); Ivan Scott, Cambridgeshire (GB)

(73) Assignee: Ultra Electronics Limited, Greenford (GB)

( * ) Notice: Subject to any disclaimer, the term of this patent is extended or adjusted under 35 U.S.C. 154(b) by 1220 days.

(21) Appl. No.: 11/273,628

(22) Filed: Nov. 14, 2005

(65) Prior Publication Data
US 2007/0098119 A1 May 3, 2007

Related U.S. Application Data

(63) Continuation of application No. PCT/GB2004/002077, filed on May 14, 2004.

(30) Foreign Application Priority Data

May 14, 2003 (GB) .................................. 0311085.5

(51) Int. Cl.
*A61F 11/06* (2006.01)
(52) U.S. Cl. .................................................. 381/71.11
(58) Field of Classification Search .................. 375/345, 375/350, 232, 229, 233, 234; 381/71.1, 71.11, 381/71.12, 71.13, 73.1, 93, 94.1, 94.9, 120, 381/121; 700/94
See application file for complete search history.

(56) References Cited

U.S. PATENT DOCUMENTS

| | | | |
|---|---|---|---|
| 4,563,681 A * | 1/1986 | Godard | 340/825.71 |
| 6,418,227 B1 * | 7/2002 | Kuo | 381/71.11 |
| 6,449,369 B1 * | 9/2002 | Carme et al. | 381/71.12 |
| 6,691,073 B1 * | 2/2004 | Erten et al. | 702/190 |
| 6,898,290 B1 * | 5/2005 | Saunders et al. | 381/71.6 |
| 6,934,593 B2 * | 8/2005 | Fontana et al. | 700/94 |
| 7,174,291 B2 * | 2/2007 | McArthur et al. | 704/224 |
| 2004/0258246 A1 * | 12/2004 | Tanghe | 381/1 |

FOREIGN PATENT DOCUMENTS

| | | |
|---|---|---|
| EP | 0 465 174 A2 | 1/1992 |
| WO | 96/11466 A1 | 4/1996 |
| WO | WO 99/05998 | 2/1999 |

OTHER PUBLICATIONS

"Robust Control of a Sensorless Base-Enhanced Moving-Coil Loudspeaker System", written by Bai and Wu; published by Acoustical Society of America in Jun. 1999; pp. 3283-3289.*

* cited by examiner

*Primary Examiner* — Alexander Jamal
(74) *Attorney, Agent, or Firm* — Dickstein Shapiro LLP

(57) ABSTRACT

An adaptive control unit is described for receiving an analog input signal containing at least an indication of a parameter to be controlled to generate an analog output signal for control of the parameter. The analog input signal contains a fed back component resulting from the analog output signal. The adaptive control unit comprises an analog filter having an adjustable gain, a gain adjuster for adjusting the gain of the analog filter using a feedforward adjustment method, and a filter for compensating for the fed back component in the analog input signal.

68 Claims, 17 Drawing Sheets

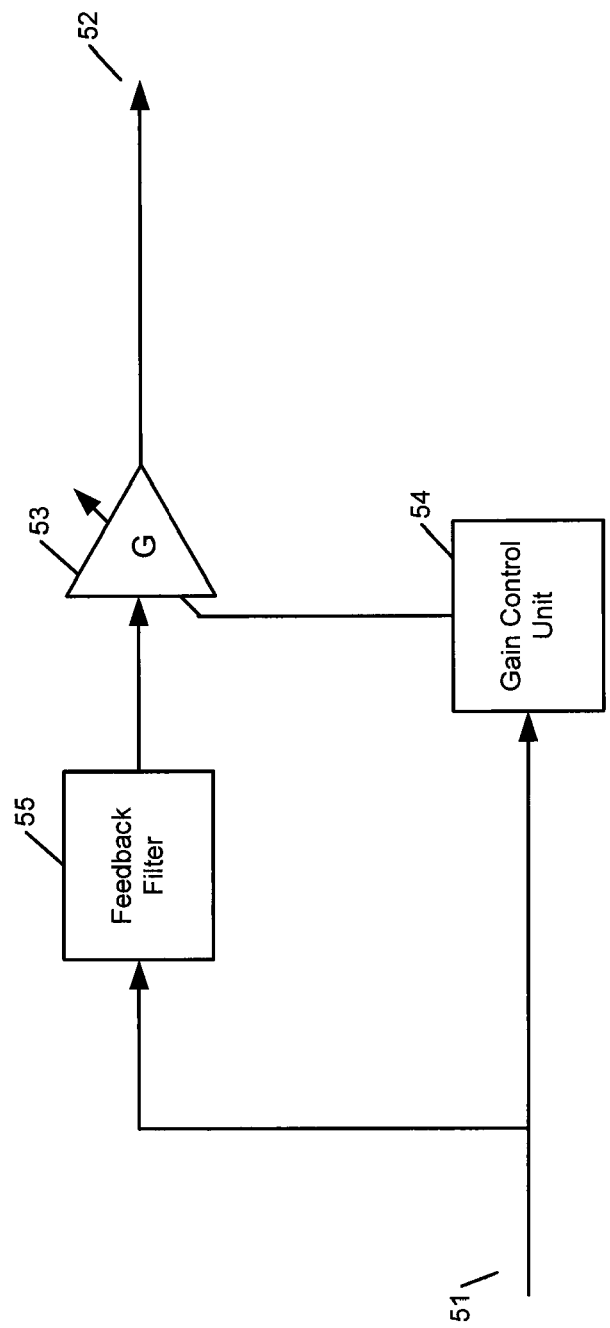

ADAPTIVE CONTROL UNIT WITH FEEDBACK COMPENSATION

This application is a continuation of International Application PCT/GB2004/002077 with an International Filing Date of May 14, 2004, and claiming priority to Great Britain Patent Application No. 0311085.5 filed on May 14, 2003, both of which are incorporated herein by reference.

The present invention relates to an adaptive control unit with feedback compensation.

Active control systems for controlling a parameter in a physical system (a plant) detect the parameter to be controlled and generate a control signal. In order to adapt control behaviour, a residual parameter is detected, i.e. an error detection is made, and this is used to modify the control behaviour in order to achieve better control. One problem in such control systems is the coupling that occurs between the output of the control system and the input of this control system i.e. undesirable feedback or pollution of the reference signal.

In one class of control systems, termed virtual earth feedback systems, the input to the control system, i.e. the measurement of the parameter, is made close to the point of control. The system thus acts in a feedback manner to drive the parameter to a desirable value such as to zero when the parameter is undesirable. However, in such systems stability of the feedback loop is a problem since the detections made are detections both of the undesired parameter and feedback from the output of the control system.

In another class of control systems, termed feed forward control systems, a reference signal is obtained which is indicative of the parameter to be controlled. This reference signal provides an indication of the degree of success of the control system in achieving the desired control. In a perfect feed forward control system, the reference signal is unpolluted by the control output of the control system. However, in practice often the reference signal is polluted by the output control signal. This can present difficulties in achieving stable control.

Control systems can be analog, digital, or a hybrid of analog and digital. For example, GB 2142091, the content of which is hereby incorporated by reference, discloses a feed forward control system for the attenuation of sound. In this system an analog feed forward controller is provided with a digital feedback compensation filter to compensate for coupling between the sound generating and detection systems. In this system the gain of the analog amplifier is fixed. Thus, this system is highly limited and does not provide for adaptive control.

GB 2222733, the content of which is hereby incorporated by reference, describes a hybrid analog and digital filter. The system disclosed overcomes the problem of the latency of digital controllers by providing an analog bypass filter in parallel with the digital filter. Digital filters have a latency problem due to analog to digital conversion delays, processing delays, and digital to analog conversion delays. In a wholly digital system this problem can only be overcome by increasing the sample rate, i.e. processing speed, thus increasing complexity and cost of the digital system. The provision of the analog bypass filter in parallel to the digital filter overcomes the latency problem of the digital controller. However, this document does not disclose any method of adaption of the hybrid analog and digital filter.

U.S. Pat. No. 6,278,786, the content of which is hereby incorporated by reference, discloses a hybrid analog and digital control system for an active noise cancellation headset system. The system is illustrated schematically in FIG. 1. A microphone 1 and loudspeaker 6 are mounted in an earcup of a headset. Thus because of the close proximity of the microphone 1 and the loudspeaker 6, the system comprises a virtual earth system. The output of the microphone 1 is digitised by an analog to digital converter 2 and the digitized signal is input to a digital signal processor 3. The digital signal processor includes a digital filter for generating a digital filtered signal for conversion to an analog control signal by a digital to analog converter. The input from the microphone 1 is also input through a compensation filter 7 and through an amplifier 8 having a gain G to generate an analog control signal. The analog control signal from the amplifier 8 and the analog control signal from digital to analog converter 4 are summed in a summing amplifier 5 before being output to the loudspeaker 6. Thus, the system comprises a digital control path in parallel with an analog control path. The digital signal processor 3 also controls the gain of the amplifier 8. The method disclosed for control is to increase the loop gain until the system is on the verge of instability, thus obtaining maximum noise reduction on the non-adaptive analog component of the system under all conditions. Thus this system does not provide a fully adaptive analog gain control loop. Further, this system makes no provision for pollution of the input signal by feedback coupling with the output signal.

In digital control systems a well known feed forward control system is the filtered X LMS algorithm. This is illustrated in FIG. 2 and reference to it can be found in "Adaptive Signal Processing" by Bernard Widrow and Samuel B. Stearns, the content of which is hereby incorporated by reference. A reference signal is detected in an active vibration system using a vibration sensor such as a microphone 10. The input signal is digitised using an analog to digital converter. In this example a feedback signal is subtracted from the input signal using a subtractor 12. A feedback signal is obtained by filtering the output of the adaptive filter 13 through a plant model $\hat{C}$. Thus in this example, pollution of the input reference signal by the output signal is accounted for. Thus the reconstructed (unpolluted) references input into the adaptive filter 13 and the output of the adapted filter is input to a digital to analog converter 14 for output to a loudspeaker 15 for noise cancellation.

In order to perform adaption of the filter characteristics of the filter W 13, the reconstructed reference is input through a model of the plant $\hat{C}$ 18 to provide a time aligned reference r which is input to an LMS algorithm 17 together with the input error signal e from the analog to digital converter 11. The LMS algorithm 17 determines updated coefficients for the adaptive filter W 13.

Thus in the example given in FIG. 2, although a reconstructed reference is provided in a feed forward control system using a model $\hat{C}$ of the plant, i.e. the acoustic response of the loudspeaker, the acoustic environment, and the microphone 10, the system suffers from the latency problem of a digital control system.

It is thus an object of the present invention to provide an improved adaptive control system in which compensation for the feedback from the output of the control system to the input of the control system is provided for in an adaptive analog or hybrid analog and digital control system.

One aspect of the present invention provides an adaptive control system for receiving an analog input signal containing at least an indication of the parameter to be controlled to generate an analog output signal for control of the parameter in which the analog input signal contains a fed back component resulting from the analog output signal. The adaptive control unit comprises an analog filter having an adjustable gain, gain adjusting means for adjusting the gain of the analog filter using the feed forward adjustment method, and filtering means for compensating for the fed back component in the analog input signal.

Thus this aspect of the present invention provides for the compensation for feedback from the output signal in the input signal thus providing a reconstructed reference signal which, even in a virtual earth arrangement enables a feed forward control method to be used on the basis of the reconstructed reference. This facilitates the adaptive control of the gain of the analog filter thus providing a more useful adaptive analog control system.

In one embodiment the gain adjustment is determined using an indication of the parameter in the analog input signal and an error component. In one embodiment the analog input signal is used for the gain adjustment after filtering by the filtering means. In a virtual earth feedback embodiment the error component is obtained from the analog input signal. In a feed forward embodiment the error component is obtained from a separate error signal.

Because of the reconstruction of the reference signal by the removal of the coupling between the output signal and the input signal of the adaptive control unit, as mentioned above, the control problem for the analog filter becomes a feed forward control problem and thus well known feed forward adaptive algorithms can be used. One such family of algorithms is the filtered reference or filtered error signal method. In particular the filtered X LMS algorithm or variants thereof can be used. Examples of such types of algorithms are the Newton method, and the filtered error LMS algorithm. Such algorithms are well known to a skilled person in the art.

In one embodiment of the present invention an analog subtractor means such as a subtracting amplifier is provided for subtracting an output of the filtering means from the analog input signal before input into the analog filter. Thus in this embodiment the compensation of the back element, i.e. the reconstruction of the reference, is provided by analog subtraction of the feedback component from the input polluted reference signal. Because this compensation takes place in the analog domain, there is no latency problem which is associated with such a compensation technique in digital adaptive control systems.

In one embodiment of the present invention filtering means is adapted to filter the analog input signal using a model of at least a phase response of a feedback path of the analog output signal to the analog input signal. In this embodiment the model particularly models the plant being controlled. For example, in an active vibration control system the model will comprise a model of the response of the vibration actuator, the acoustic response of the plant, and the response of the vibration detector.

In another embodiment of the present invention, the filtering means is adapted to filter the analog input signal using a model of at least a phase response of a feedback path of the analog output signal to the analog input signal, and a model of at least a phase response of the analog filter. In the present invention the model can be of the phase response of a plant (path) or the phase and amplitude response of the plant.

In one embodiment the analog subtractor means is arranged for subtraction of the output of the filtering means from the analog input signal before it is input to the filtering means.

The filtering means in accordance with the present invention can comprise an analog or digital filter. The benefit of an analog filter is that there is no problem associated with delays caused by analog to digital conversion and digital to analog conversion. However, since the filtering means in accordance with an embodiment of the present invention models the response of the plant, this response can require adaption or adaptive learning, which presents problems for analog filters. The benefit of using digital filters is the ease with which the digital filter characteristics can be adapted to model the plant as required.

In one embodiment of the present invention the filtering means comprises a digital filter and a digital subtractor means is provided for digitally subtracting a digital representation of the analog output signal from a digital representation of the analog input signal. In one embodiment the digital filter is adapted to filter using a model of at least a phase response of a feedback path of the analog output signal to the analog input signal and to include a factor in the model compensating for a delay caused by analog to digital conversion and digital to analog conversion of the digital result of digitally filtering.

In one embodiment in which the filtering means is digitally implemented, the filtering means includes an analog to digital converter for receiving and digitizing the analog input signal, at least one digital filter for filtering the digitized input signal and a digital to analog converter for converting the filtered digitized input signal to produce an analog compensation signal for compensating for feedback of the analog output signal in the analog signal.

In one embodiment the filtering means is adapted to filter the analog output signal. In one specific embodiment the filtering means is adapted to filter using a model of at least a phase response of a feedback path of the analog output signal to the analog input signal. In one specific embodiment analog subtractor means such as a subtracting amplifier is provided for subtracting an output of the filtering means from the analog input signal before input to the analog filter.

Thus this embodiment of the present invention provides for feedback compensation by taking the output signal of the analog amplifier. The filter means can be analog or digital. If a digital filter is used to provide for ease of setting up and adaption of the coefficients of the filter, the digital filter will need to include a factor in the model compensating for the delay caused by analog to digital conversion of the analog output signal and the digital to analog conversion of a digital result of digitally filtering.

In one embodiment the gain adjusting means comprises a digital control means. The digital control means can comprise a filtered reference control means. In one embodiment the analog filter comprises an amplifier. The amplifier can comprise a digitally controlled amplifier in one specific embodiment.

In one embodiment of the present invention the analog filter comprises an analog compensation filter. Thus in this embodiment of the present invention the adaptive control unit comprises an adaptive analog filter.

In one embodiment the filtering means and the gain adjusting means comprises a programmed digital controller.

The filtering means of the present invention can perform the filtering in the time or frequency domain.

In one embodiment the filtering means comprises a one-bit analog to digital converter for converting the analog signal to a one-bit digital signal, a digital filter comprising a model of the feedback path of the analog output signal to the analog input signal and adapted to digitally filter the one-bit digital signal by a series of additions, and a one-bit digital signal to analog converter for converting the output of the digital filter to an analog filter output for use in the compensation for the fed back component in the analog input signal. Thus in this embodiment of the present invention the use of the one-bit ADC and DAC provides for a very simple implementation of the digital filtering.

In one embodiment of the present invention the adaptive control unit includes a digital filter for digitally filtering the analog input signal arranged in parallel with the analog filter, and a combiner is provided for combining the output of the analog filter and the output of the digital filter to provide the analog output signal for the control unit. Thus this embodiment of the present invention provides a hybrid analog and digital control unit in which, due to the reference signal reconstruction, adaption of the gain of the analog filter is provided for.

In a preferred embodiment the digital filter unit comprises an adaptive digital filter which can, for example, use a filtered reference method for adaption. In a preferred embodiment the adaptive digital filter includes feedback compensation for compensating for a fed back component from an output of the digital adaptive filter in the analog input signal. Thus in this way this embodiment of the present invention provides for reconstruction of the input reference signal to compensate for feedback from the component of the analog control and the component of the digital control for the hybrid analog-digital control system.

One embodiment of the present invention provides for a multi-channel control system in which the adaptive control unit receives a plurality of the analog input signals each containing an indication of the parameter to be controlled to generate a plurality of analog output signals for control of the parameter. Each analog output signal contains a fed back component resulting from each said analog output signal. The adaptive control unit comprises a plurality of analog filters, each having an adjustable gain, wherein the gain of each analog filter is adjusted using a feed forward adjustment method and the filtering means compensates for the fed back component in each analog input signal.

In one specific embodiment the gain adjustment is carried out using a multi-channel filtered reference method for the adjustment of the gain of each analog filter. For example, the methods can comprise any of the well known multi-channel feed forward filtered reference methods such as the filtered X LMS algorithm.

One aspect of the present invention provides a control system for controlling a parameter of a plant in which the control system comprises the adaptive control unit, plant parameter detection means for detecting the parameter and for providing the detections as the analog input signal to the adaptive control unit, plant control means for receiving the analog output signal and for controlling the parameter using the analog output signal.

In one embodiment the plant parameter detection means is adapted to also provide a detected error component in the analog input signal and the gain adjustment means is adapted to determine the gain adjustment using the indication of the parameter and the error component. First this embodiment comprises a virtual earth feedback system.

In an alternative feed forward control system, error detection means are provided for detecting an error component. Gain adjustment means is adapted to determine the gain adjustment using the indication of the parameter and the error component.

In one embodiment of the present invention the control system comprises an active vibration control system for controlling vibrations. In this embodiment the plant parameter detection means comprises at least one vibration sensor, the plant control means comprises at least one vibration actuator and the error detection means comprises at least one vibration sensor.

The present invention is applicable to a proportional integral differential (PID) controller in which a proportional unit comprises a control unit for adjusting the gain of the proportional unit, an integral unit comprises a control unit for adjusting the gain of the integral unit, and a differential unit comprises a control unit for adjusting the gain of the differential unit.

Summing means is provided for summing the output of the proportional unit, the integral unit and the differential unit to generate an output of the PID controller.

Embodiments of the present invention will now be described with reference to the accompanying drawings, in which:

FIG. 17 is a schematic diagram of an adaptive control unit that receives an analog input that contains a fed back component resulting from an analog output.

Figure 1:
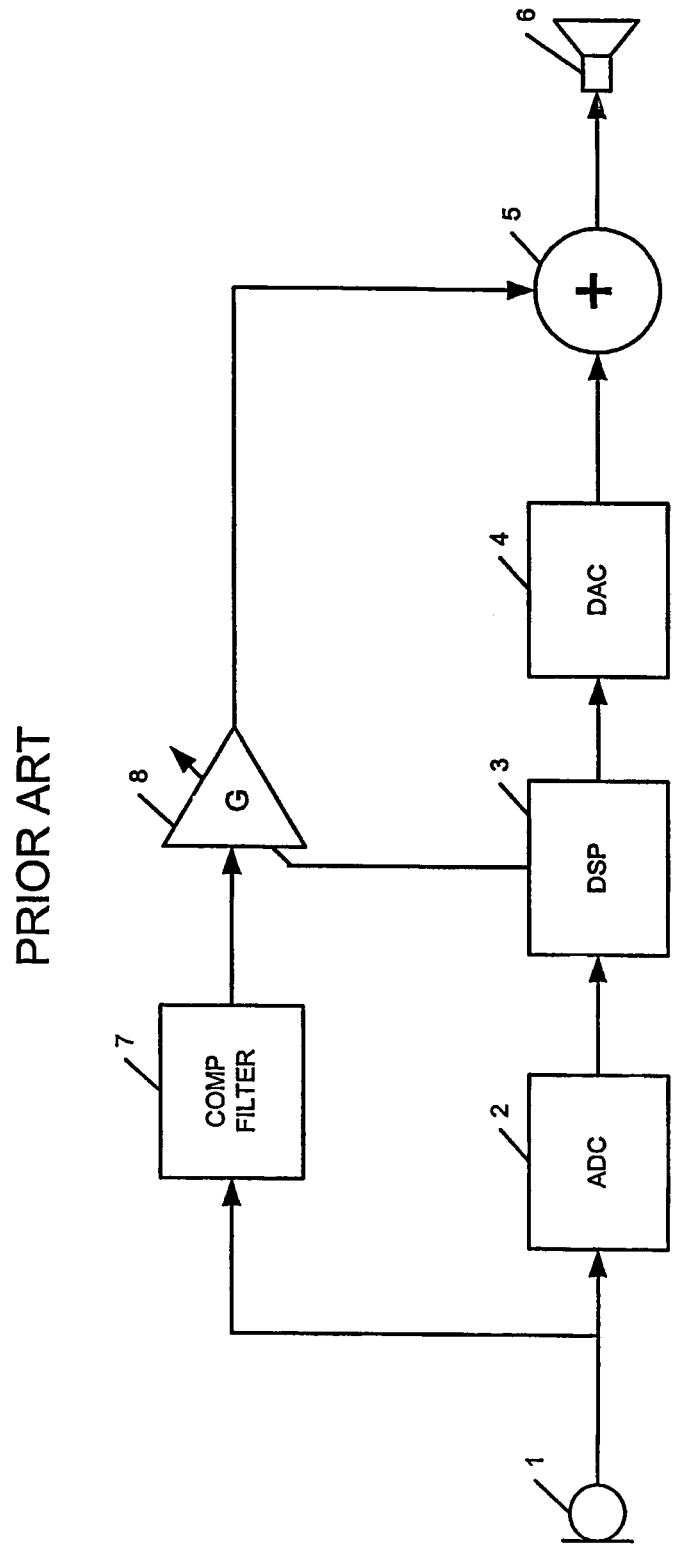
FIG. 1 is a schematic diagram of a prior art hybrid analog and digital virtual earth feedback control system.

In the following embodiments of the present invention, the embodiments illustrate the application of the adaptive control unit to active vibration control, and specifically to active noise control. However, the present invention is not limited to the application of the adaptive control units to active noise control or active vibration control, and the present invention is applicable to the active control of any parameters for a plant i.e. any physical parameters. The parameters can comprise electrical, acoustic, mechanical, optical, or thermal parameters.

In the following amendments, like reference numerals are used in the embodiments for like components.

The first embodiment of the present invention will now be described with reference to FIG. 3. This embodiment of the present invention comprises a virtual earth feedback control system in which the gain of an analog compensation filter is adaptively controlled by compensating for coupling between the output and the input i.e. feedback in order to regenerate the reference to enable the adaptive control of the gain of the compensation filter using a feed forward control method.

Figure 3:
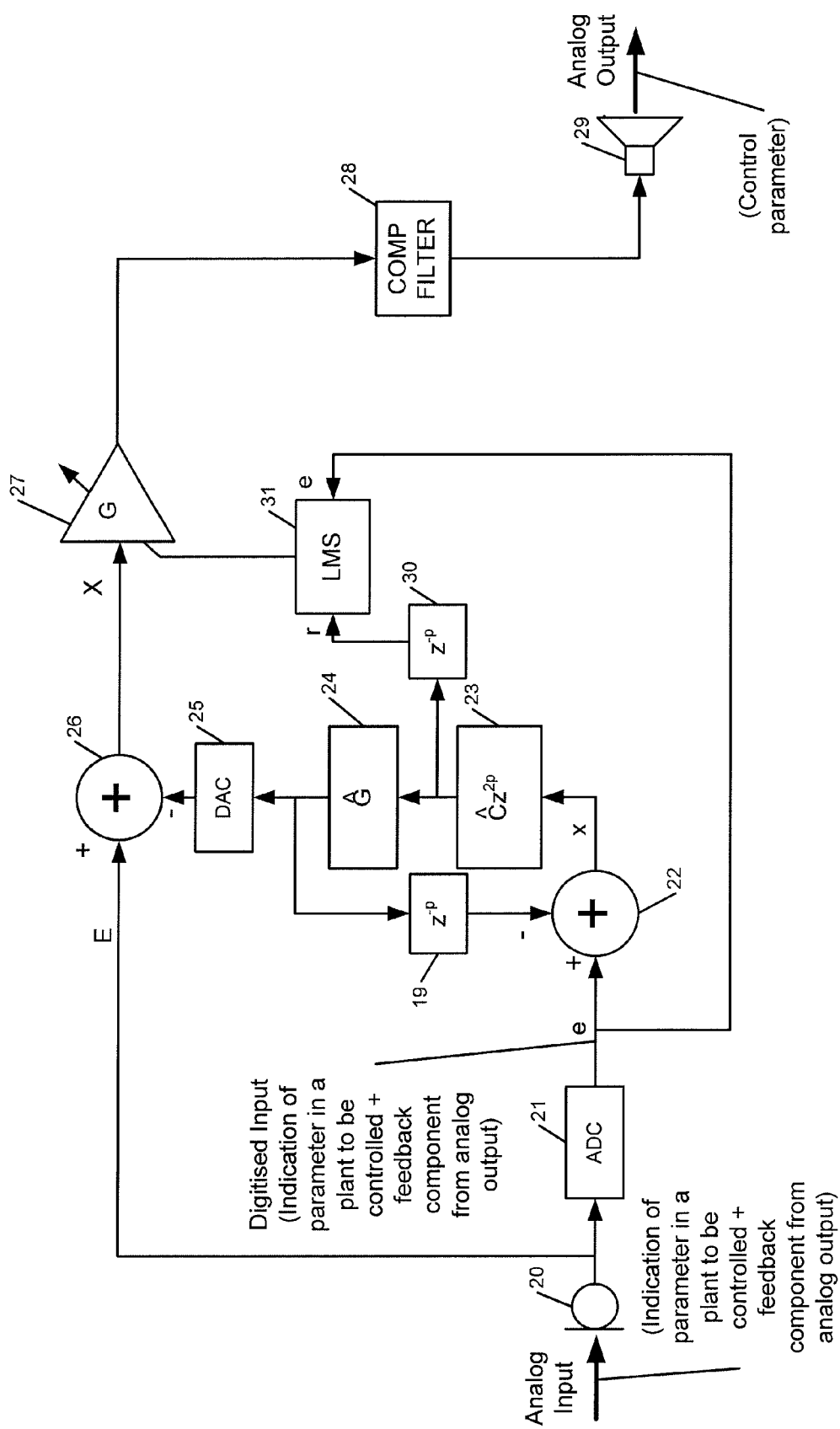
FIG. 3 is a schematic diagram of a virtual earth feedback analog adaptive control unit in accordance with a first embodiment of the present invention.

Referring to FIG. 3, a microphone 20 detects noise in a region in which a loudspeaker 29 is positioned to control the noise. For example, the microphone 20 in the loudspeaker 29 can be provided in a headset. The signal from the microphone 20 is an analog signal which is input to an analog subtractor 26 for subtraction of the feedback signal to regenerate the analog reference signal X for input into the amplifier 27 having a variable gain. The output of the amplifier is output through the compensation filter 28 to drive the loudspeaker 29.

The signal from the microphone 20 is also input to an analog to digital converter 21 which introduces a delay ($Z^{-n}$) i.e. a sampling delay. The digitised signal (e) is then subject to digital subtraction by a subtractor 22 which performs a digital compensation for the feedback signal in order to reconstruct the reference signal (x). The reconstructed reference signal (x) is then input into a time advanced model of the acoustic response on the system. $\hat{C}$ is a digital filter which models the acoustic response of the system i.e. the response of the loudspeaker 29, the acoustic response of the path between the loudspeaker and the microphone, and the response to the microphone 20. The factor $Z_{(m+n)}$ comprises a time advancement applied to the acoustic model $\hat{C}$ to compensate for the digitisation delay n and the digital to analog conversion delay m. The output of the filter 23 is then input into a model 24 of the response of the variable gain amplifier 27. The output is an estimate of the feedback coupling from the output of the variable gain amplifier 27 to the digital error signal e output from the analog to digital converter 21. This signal is fed back to the subtractor 22 for digital subtraction i.e. for compensation digitally for the coupling of the output of the control unit to the input. The output from the model 24 is also input to a digital to analog converter 25 which incurs the digital conversion delay of n to output an analog signal to the analog subtractor 26 to subtract the feedback signal from the input signal E to regenerate the analog reference X for input to the variable gain amplifier 27.

In this embodiment of the present invention the reconstructed reference x is digitally filtered not only by a time advanced model of the acoustic response to the system, but also by model of the response of the variable gain amplifier because a measurement of the feedback is obtained from the input signal from the microphone 20.

The output of the filter 23 is also input into a delay $Z^{-n}$ 30. The delay 30 is provided to reinsert the delay caused by analog to digital conversion 21. For generation of the reference signal r for use in the LMS algorithm 31. The LMS algorithm 31 also receives the digitised signal e from the analog to digital converter 21 to determine adaptively the gain of the variable gain amplifier 27. The LMS (least mean squared) algorithm is well-known in the prior art and is one example of a feed forward adapted algorithm for adjustment of the gain of the amplifier 27 made possible by the reconstruction of the analog reference X and the digital reference x.

Figure 2:
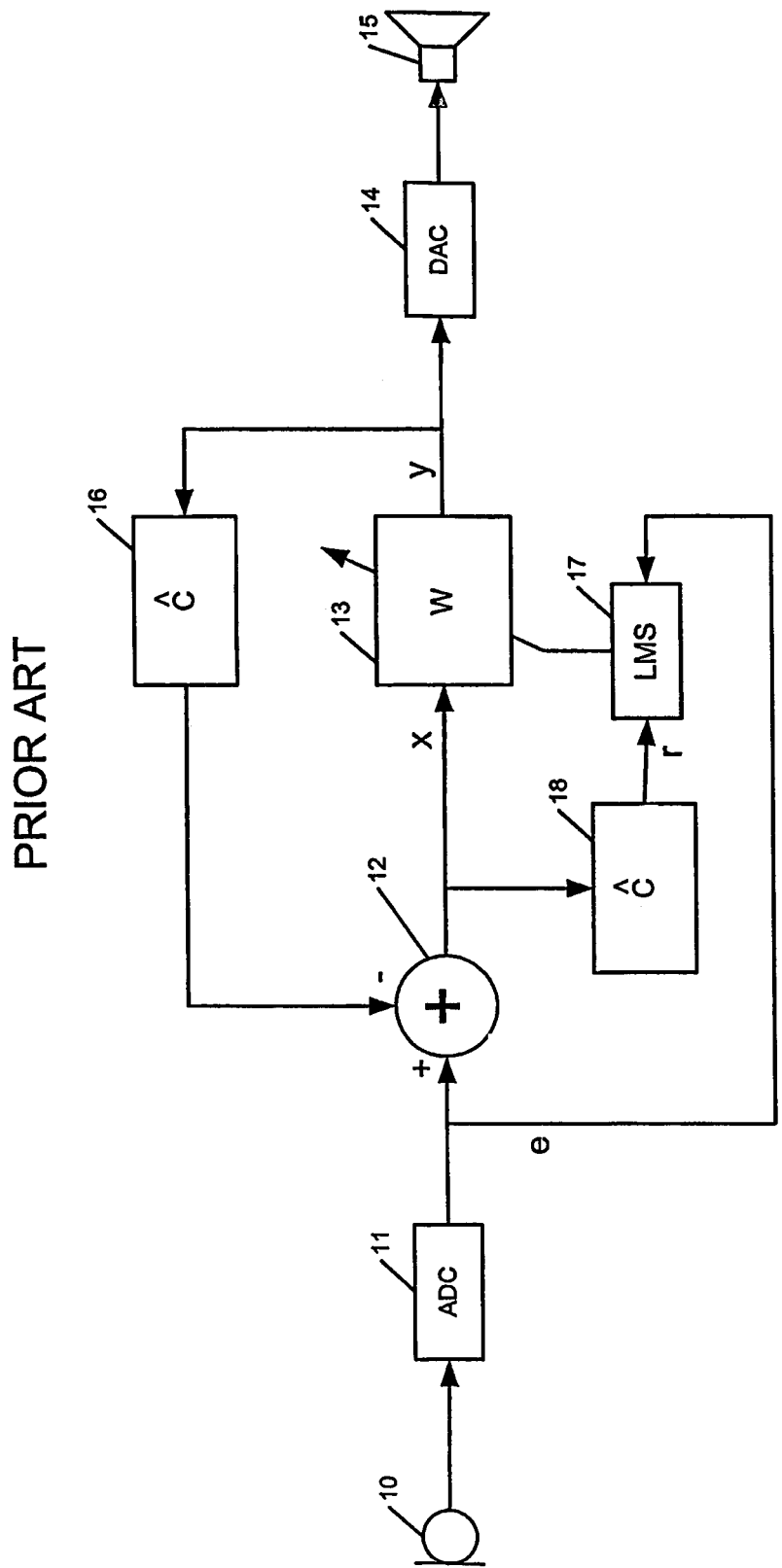
FIG. 2 is a schematic diagram of a prior art digital virtual earth feedback control system with reference regeneration and using the filtered X algorithm.

A second embodiment of the present invention will now be described with reference to FIG. 4. This embodiment of the present invention comprises a hybrid analog and digital virtual earth feedback control unit. The adapted control unit of this embodiment of the present invention comprises a combination of the virtual earth feedback analog filter of the first embodiment of the present invention illustrated in FIG. 3 and the filtered X LMS digital virtual earth feedback control unit of the prior art illustrated in FIG. 2.

Figure 4:
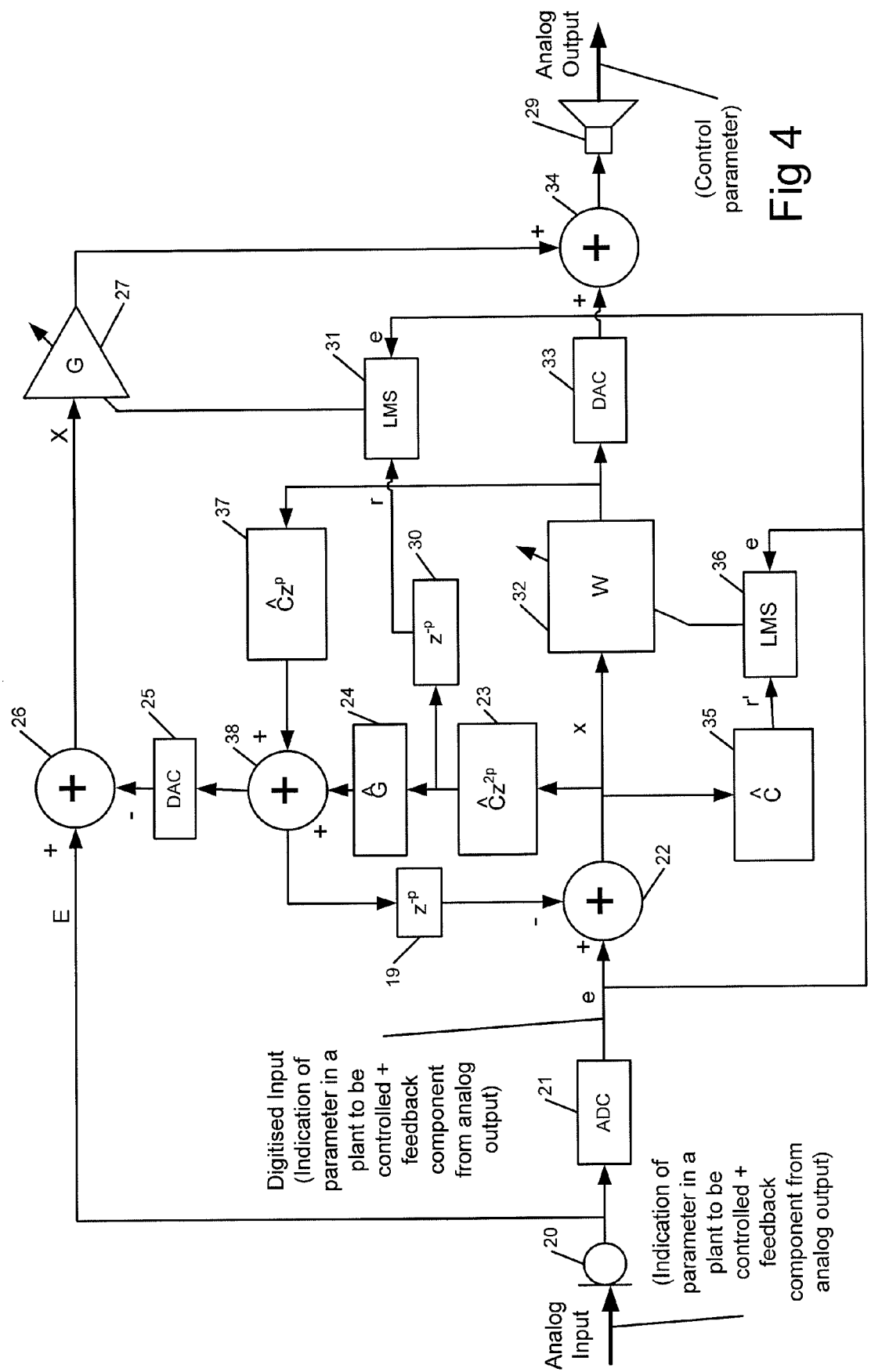
FIG. 4 is a schematic diagram of a virtual earth feedback hybrid analog and digital adaptive control system in accordance with a second embodiment of the present invention.

Referring to FIG. 4, a microphone 20 detects noise in a region adjacent to a loudspeaker 29 used for generating the control sound. In this embodiment, the microphone 20 in the loudspeaker 29 are closely coupled and thus the microphone 20 provides both the reference signal indicating the undesirable noise to be cancelled, and the residual noise in combination. The analog output of the microphone 20 E is input to an analog subtractor 26 for the subtraction of an analog compensation signal to regenerate the analog reference X. Regenerated reference X is then input into an amplifier 27 with variable gain. The analog output of the amplifier 27 is then input to an analog summation unit 34 for summation with the output of a digital filter component of the unit. The combined output from the analog combiner 34 is then output to the loudspeaker 29.

The output of the microphone 20 is also input to an analog to digital converter 21 which experiences the sampling delay of $Z^{-n}$. The digitised signal e is then input into a digital subtractor 22 for the subtraction of the feedback signal. The reconstructed reference signal x' is then input into the time advanced model of the acoustic response of the system 23 ($\hat{C}Z^{(m+n)}$). The output of the filter 23 is input to a second filter 24 which a model of the response of the variable gain amplifier 27. The output of the filter 24 is then input to a combiner 38 for digital combination with a feedback signal for the digital filter part. The output of filter 24 comprises the feedback part for the analog component. The output of the combiner 38 comprises the complete digital feedback signal for reconstruction of the reference signal to enable for feed forward control of both the gain in the analog path and the adaptive filter 32 in the digital path. The signal is feed back to the digital subtractor 22 for the regeneration of the digital reference x' and it is also output through a digital to analog converter 25 for subtraction by the analog subtractor 26 for the generation of the regenerated analog reference X for input to the variable gain amplifier 27.

The output of the filter 23 is also input to a delay unit 30 for delay by $Z^{-n}$. The delay unit 30 adds a delay caused by the analog to digital conversion by the ADC 21 to generate the reference signal r for use by the LMS algorithm 31. The LMS algorithm 31 also receives the digital error signal e output from the ADC 21 for performing the LMS algorithm to determine the gain of the variable gain amplifier 27.

The reconstructed digital reference x' output from the digital subtractor 22 is also input to a digital adaptive filter W 32 for the generation of the digital control signal. The digital control signal is digital to analog converted in DAC 33. The output of the DAC 33 is combined in the analog combiner 34. The output of the digital adaptive filter 32 is also feedback through a model of the acoustic response to the system $\hat{C}$ 37 and the output of the filter 37 is combined by the combiner 38 with output of the filter 24 to generate the combined feedback signal. The adaption of the digital filter W32 is performed by inputting the reconstructed reference x' through a model of the acoustic system $\hat{C}$ 35 to generate a reference r'. The LMS algorithm 36 receives the reference r' and the output e of the ADC 21 to determine coefficients for the adaption of the filter W 32.

In this embodiment of the present invention, the gain of the variable gain amplifier 27 and the coefficients of the digital filter W 32 are both adaptively determined by respective LMS algorithms. This feed forward type adjustment of the hybrid analog and digital control is made possible by the generation of the analog reconstructed reference X and the digital reconstructed reference x'.

Figure 5:
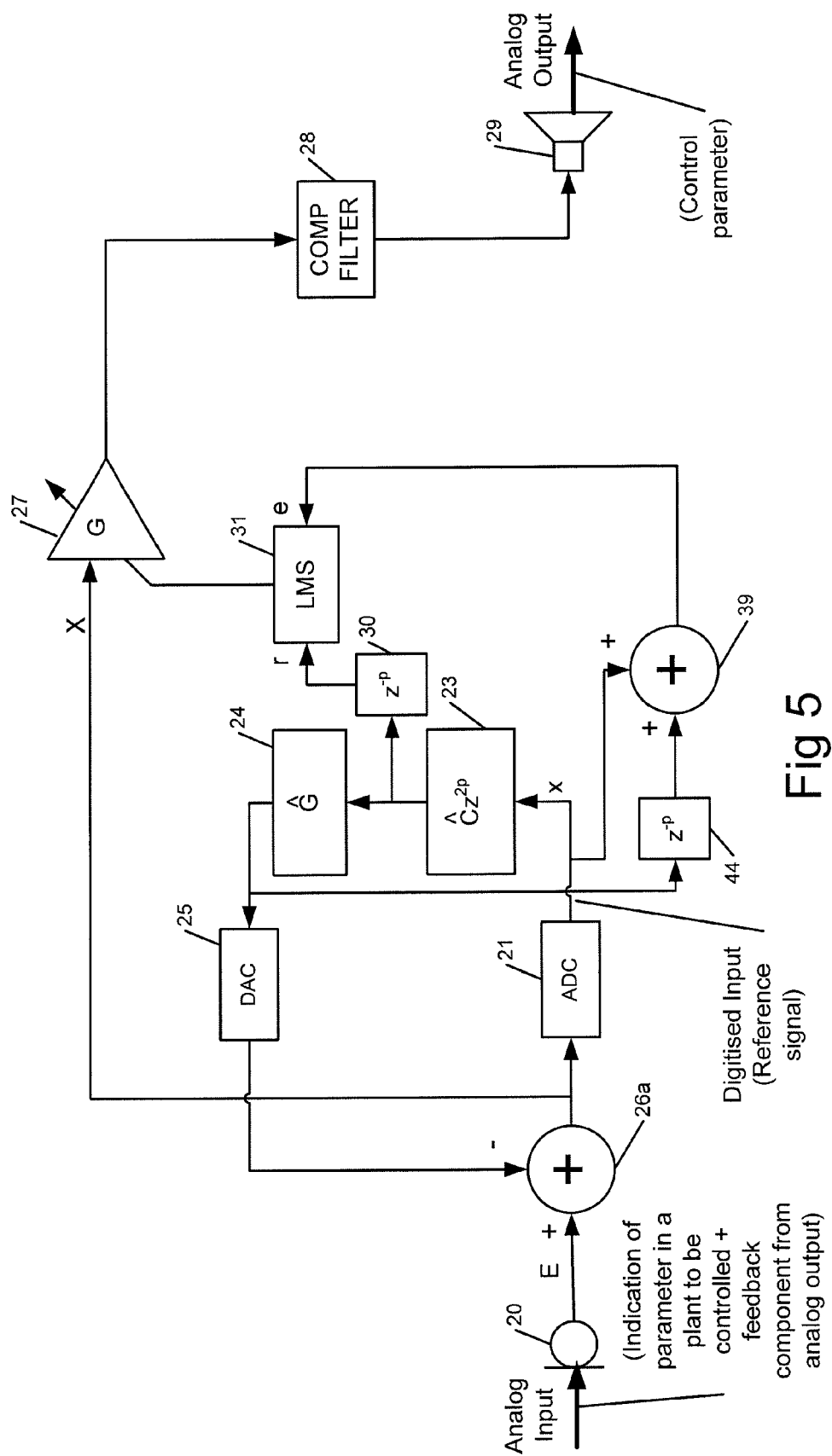
FIG. 5 is a schematic diagram of a virtual earth feedback analog adaptive control system in accordance with a third embodiment of the present invention.

The third embodiment of the present invention will be described with reference to FIG. 5. This embodiment of the present invention comprises a virtual earth feedback analog adaptive control unit and is similar to the first embodiment of the present invention except that instead of performing compensation using an analog subtractor 26 and a digital subtractor 22, a single subtractor 26a is used and the output of the subtractor 26a is the reconstructed analog reference signal X which is input to the amplifier 27 and the analog to digital converter 21.

This embodiment to the present invention then only differs from the first embodiment of the present invention in that the error signal e for use by the LMS algorithm 31 requires reconstruction. This achieved by the feedback signal using a digital combiner 39. Thus in this embodiment although only one analog subtractor is required instead of an analog subtractor and a digital subtractor, a digital combiner 39 is additionally required to reconstruct the error signal e.

Figure 6:
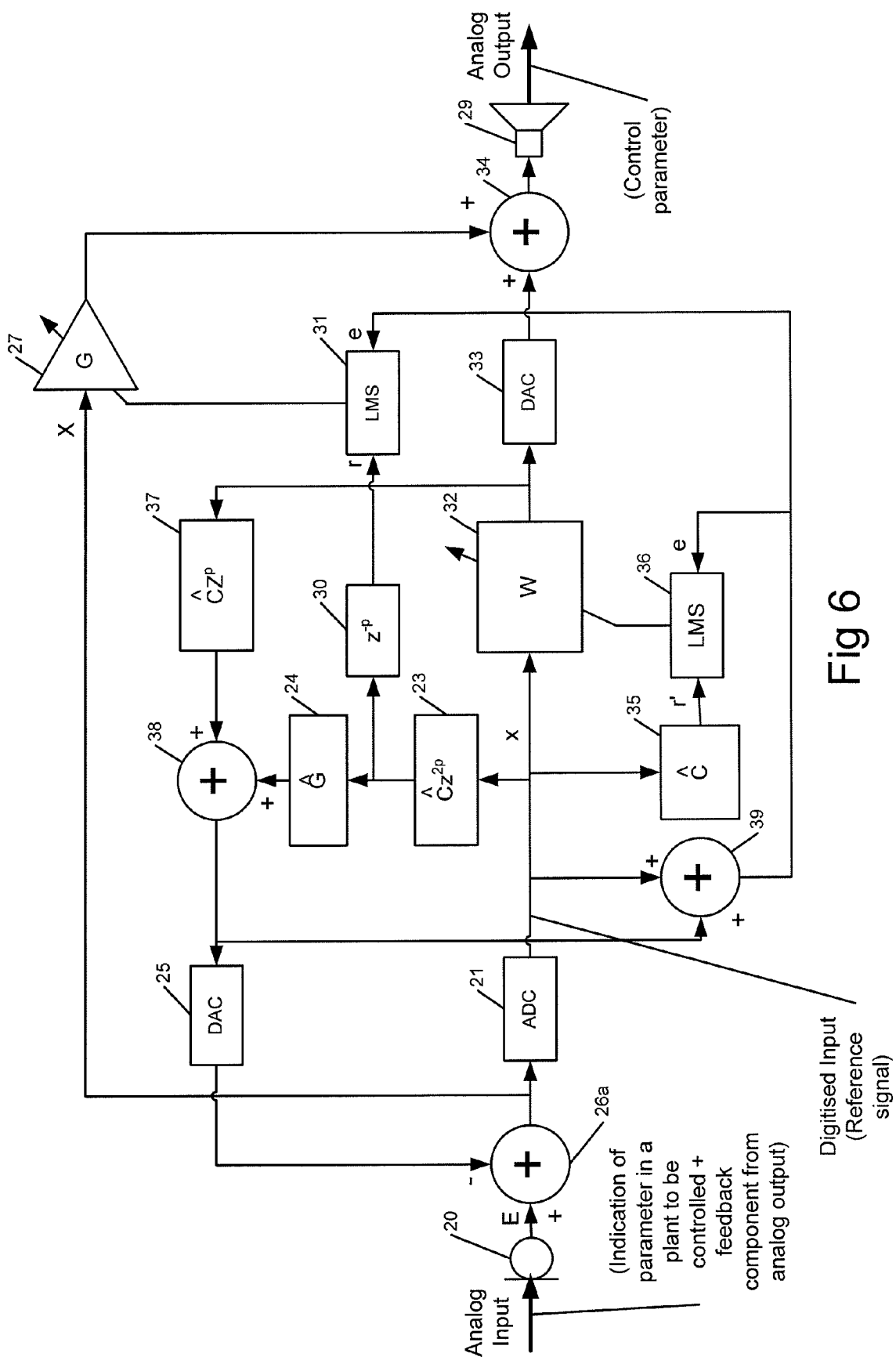
FIG. 6 is a schematic diagram of a virtual earth feedback hybrid analog and digital adaptive control system in accordance with a fourth embodiment of the present invention.

The fourth embodiment of the present invention will now be described with reference to FIG. 6. This embodiment of the present invention comprises a virtual earth feedback hybrid analog and digital adaptive control unit. This embodiment comprises a combination of the third embodiment of the present invention with the prior art filter LMS algorithm illustrated in FIG. 2. This embodiment is similar to the second embodiment of the present invention except that the digital subtractor 22 is not used and the analog subtractor 26 is arranged as analog subtractor 26a so that its output i.e. the reconstructed analog reference X is input into the analog digital converter 21 as described hereinabove with reference to FIG. 5 for the third embodiment of the present invention.

This embodiment of the present invention differs from the second embodiment of the present invention in that a digital combiner 39 is required in order to reconstruct the error signal e for both LMS algorithms 31 and 36 for the adaption of the analog gain for the amplifier 27 and the filter coefficients for the adaptive filter W 32 respectively.

Figure 7:
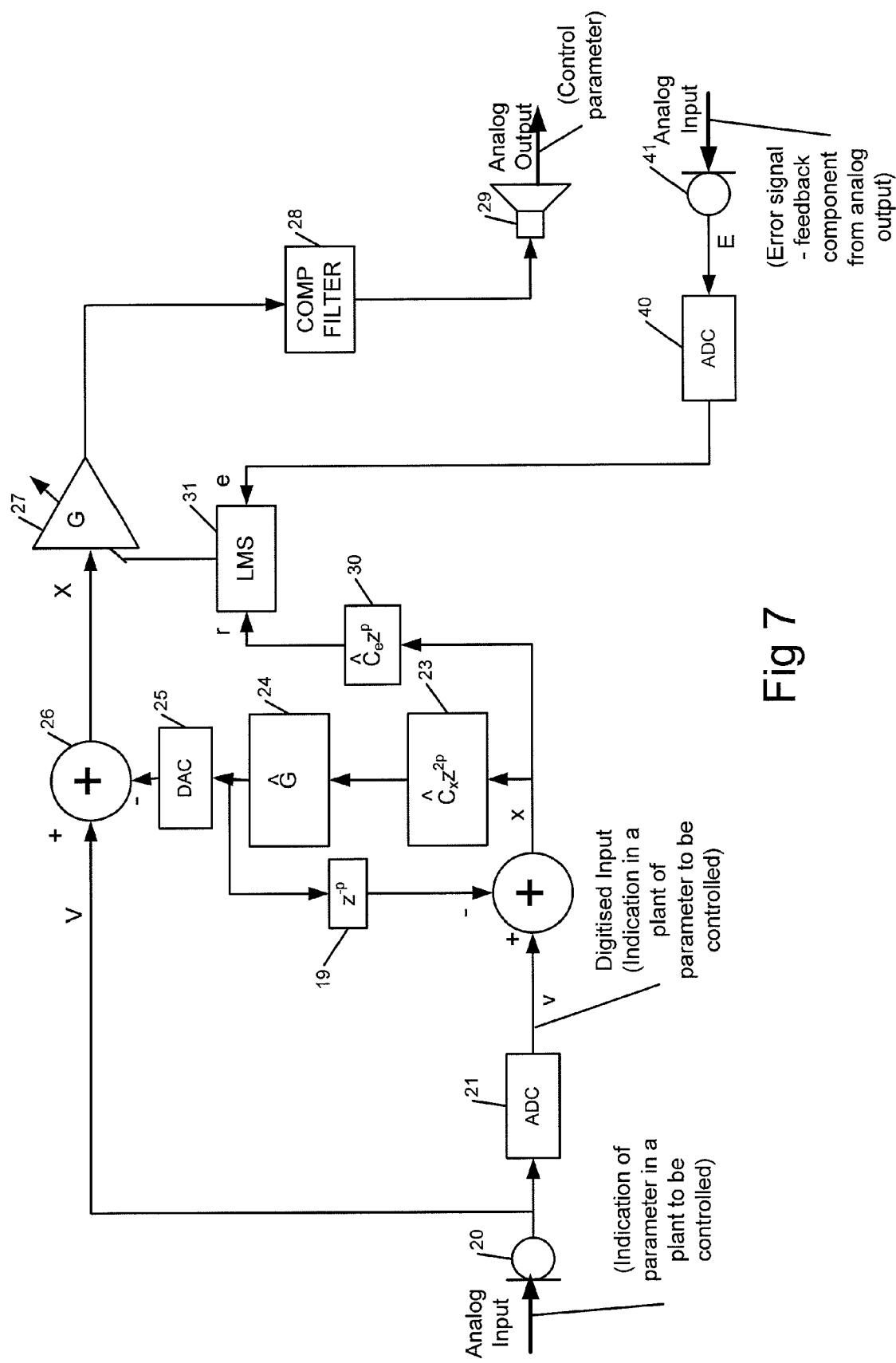
FIG. 7 is a schematic diagram of a feed forward analog adaptive control system in accordance with a fifth embodiment of the present invention.

A fifth embodiment of the present invention will now be described with reference to FIG. 7. This embodiment of the present invention comprises a feed forward analog adaptive control unit. This embodiment of the present invention is similar to the first embodiment of the present invention except that an error sensing microphone 41 is provided for the detection of residual vibrations in an area adjacent to the loudspeaker 29. The output of the error sensing microphone 41 is input to an analog to digital converter 40 for generation of the digital error signal e for input into the LMS algorithm 31.

In this feed forward arrangement, the microphone 20 acts as a feed forward microphone detecting undesirable vibrations. This signal is used for the generation of cancelling vibrations by the loudspeaker 29. The microphone 41 detects the error in the noise cancellation for use in the adaption of the gain of the amplifier 27 using an LMS algorithm. Coupling between the loudspeaker 29 and the reference microphone 20 be compensated for using the filters 23 and 24 to enable adaption of the gain of the amplifier 27 using the feed forward method i.e. LMS algorithm.

Figure 8:
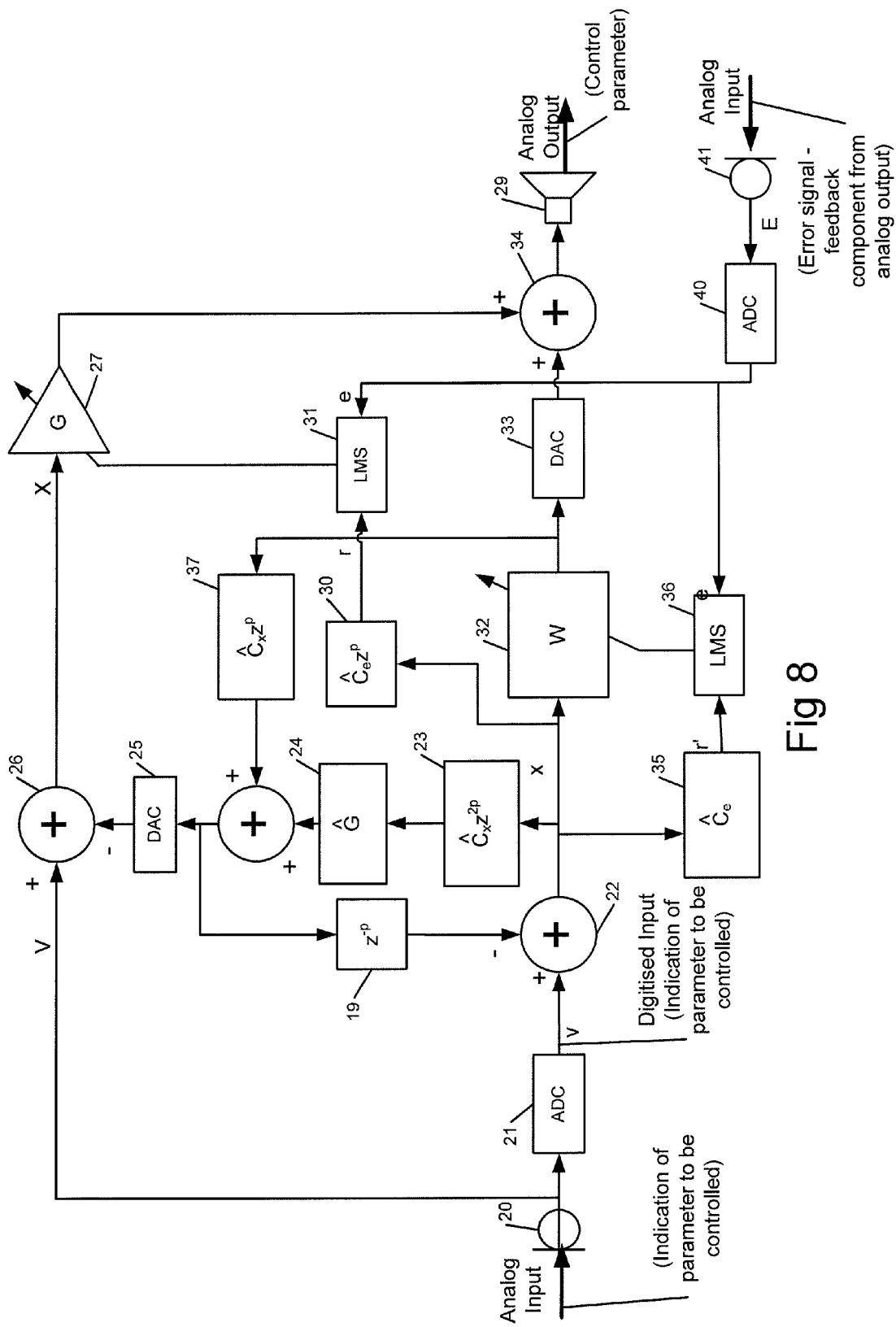
FIG. 8 is a schematic diagram of a feed forward hybrid analog and digital adaptive control system in accordance with a sixth embodiment of the present invention.

A sixth embodiment of the present invention will be now described with reference to FIG. 8. This embodiment of the present invention is a feed forward hybrid analog and digital adaptive control unit. This embodiment comprises a combination of the fifth embodiment of the present invention and the prior art filtered X LMS algorithm illustrated in FIG. 2. This embodiment of the present invention is similar to the second embodiment of the present invention except that an error sensing microphone 41 is provided adjacent to the loudspeaker 29 and the microphone 20 is provided as a reference sensing microphone a distance away from the loudspeaker 29. The output of the error sensing microphone 41 is analog to digital converted by the ADC 40 and the output digital error signal e is input to the LMS algorithm 31 and the LMS 36 for the adaption of the gain of the amplifier 27 and the adaption of the filter coefficients of the digital adaptive filter W 32 respectively.

In this embodiment of the present invention any pollution of the reference signal from the microphone 20 by the output of the loudspeaker 29 is compensated for by the filtering carried out by the filters 23, 24 and 37 to provide a combined feedback compensation signal for digital compensation using the digital subtractor 22 and for analog compensation using the analog subtractor 26.

Figure 9:
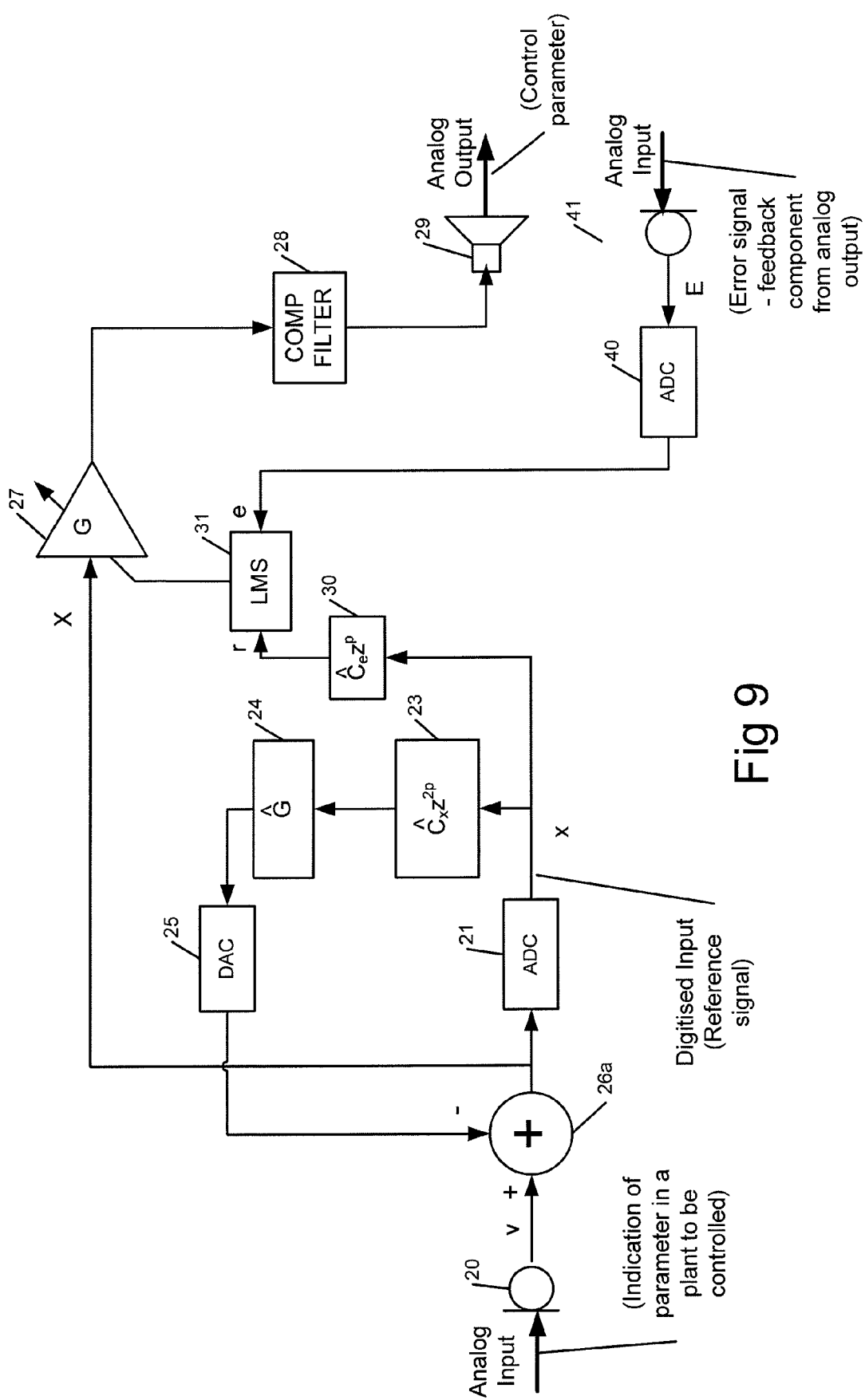
FIG. 9 is a schematic diagram of a feed forward analog adaptive control system in accordance with a seventh embodiment of the present invention.

A seventh embodiment of the present invention will now be described with reference to FIG. 9. This embodiment of the present invention comprises a feedforward analog adaptive control unit. This embodiment of the present invention is similar to the third embodiment of the present invention except that an error sensing microphone 41 is provided in the vicinity of the loudspeaker 29. The microphone 20 is provided as a reference microphone some distance from the loudspeaker 29. The output of the error sensing microphone 41 is input to an analog-to-digital converter 40 to generate the digital error signal e for input to the LMS algorithm 31.

Once again, in this embodiment undesirable coupling between the output of the loudspeaker 29 and the reference microphone 20 resulting in pollution of the reference signal is compensated for by generation of a compensation signal using the filters 23 and 24 and subtraction using the analog subtractor 26a.

Figure 10:
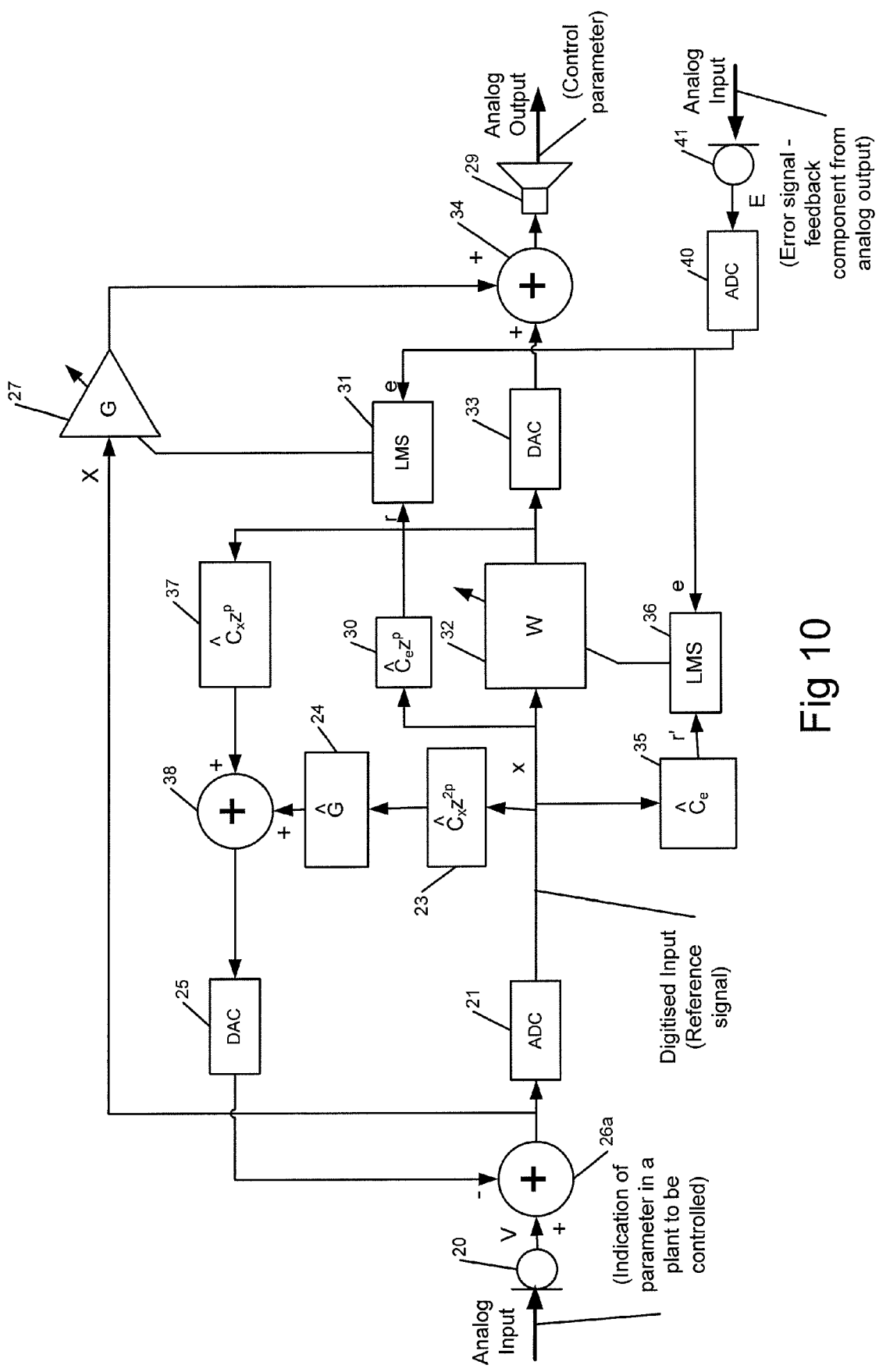
FIG. 10 is a schematic diagram of a feed forward hybrid analog and digital adaptive control system in accordance with an eighth embodiment of the present invention.

An eighth embodiment of the present invention will now be described with reference to FIG. 10. This embodiment comprises a feedforward hybrid analog and digital adaptive control unit. This embodiment comprises a combination of the seventh embodiment of the present invention and the filtered X LMS algorithm illustrated in FIG. 2. This embodiment is also similar to the fourth embodiment of the present invention except that an error microphone 41 is provided in the vicinity of the loudspeaker 29 to provide a measure of the error in the cancellation of sound. The microphone 20 acts as a reference microphone. The output of the microphone 41 is input to analog-to-digital converter 40 to generate the digital error signal e for input into the LMS algorithm 31 and the LMS algorithm 36 for the adaption of the gain of the amplifier 27 and the filter coefficients of the adaptive filter W 32 respectively.

Figure 11:
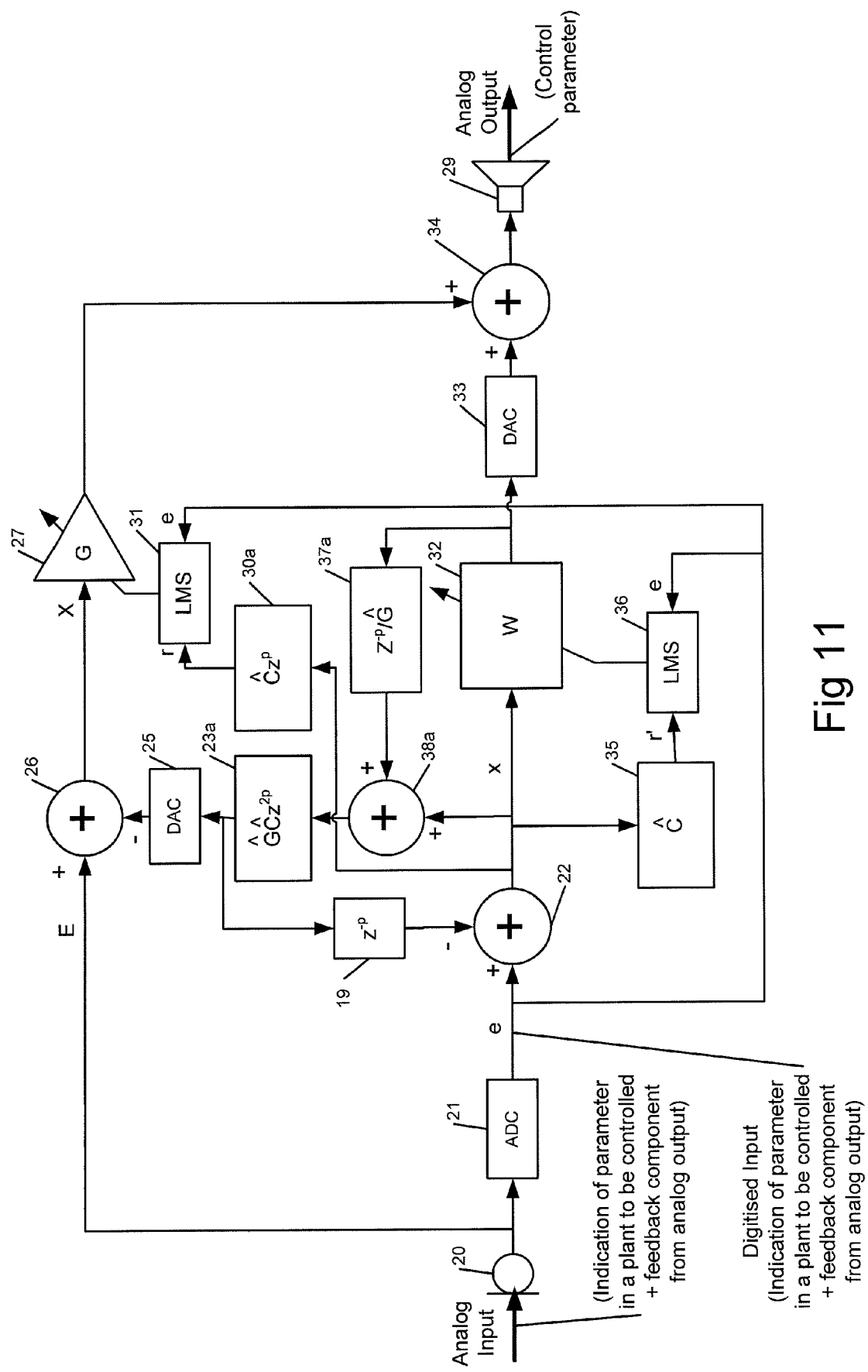
FIG. 11 is a schematic diagram of a virtual earth feedback hybrid analog and digital adaptive control system in accordance with a ninth embodiment of the present invention.

A ninth embodiment of the present invention will now be described with reference to FIG. 11. This embodiment comprises a virtual earth feedback hybrid adaptive control unit. This embodiment of the present invention is similar to the second embodiment of the present invention except that the filter used for the compensation for the feedback for the digital filter components is not $\hat{C}$ as in the second embodiment but is instead $Z^{-(m+n)}/G$. A filter 37a generates a feedback component which is combined in a digital combiner 38a for being input into a combined filter unit 23a which performs a filter operation $\hat{G}\hat{C}Z^{(m+n)}$. The output of the filter 23a comprises the feedback component which is digital-to-analog converted by the DAC 25 for output to the analog subtractor 26 and also output to the digital subtractor 22.

In order to generate the reference signal r' the reference signal x' is passed through a filter unit 30a which filters the reconstructed reference signals x' by a time advanced model of the acoustic system, i.e. $\hat{C}Z^m$. The LMS algorithm 31 receives the reference signal r' from the filter 30a and the error signal e from the output of the ADC 21.

Figure 12:
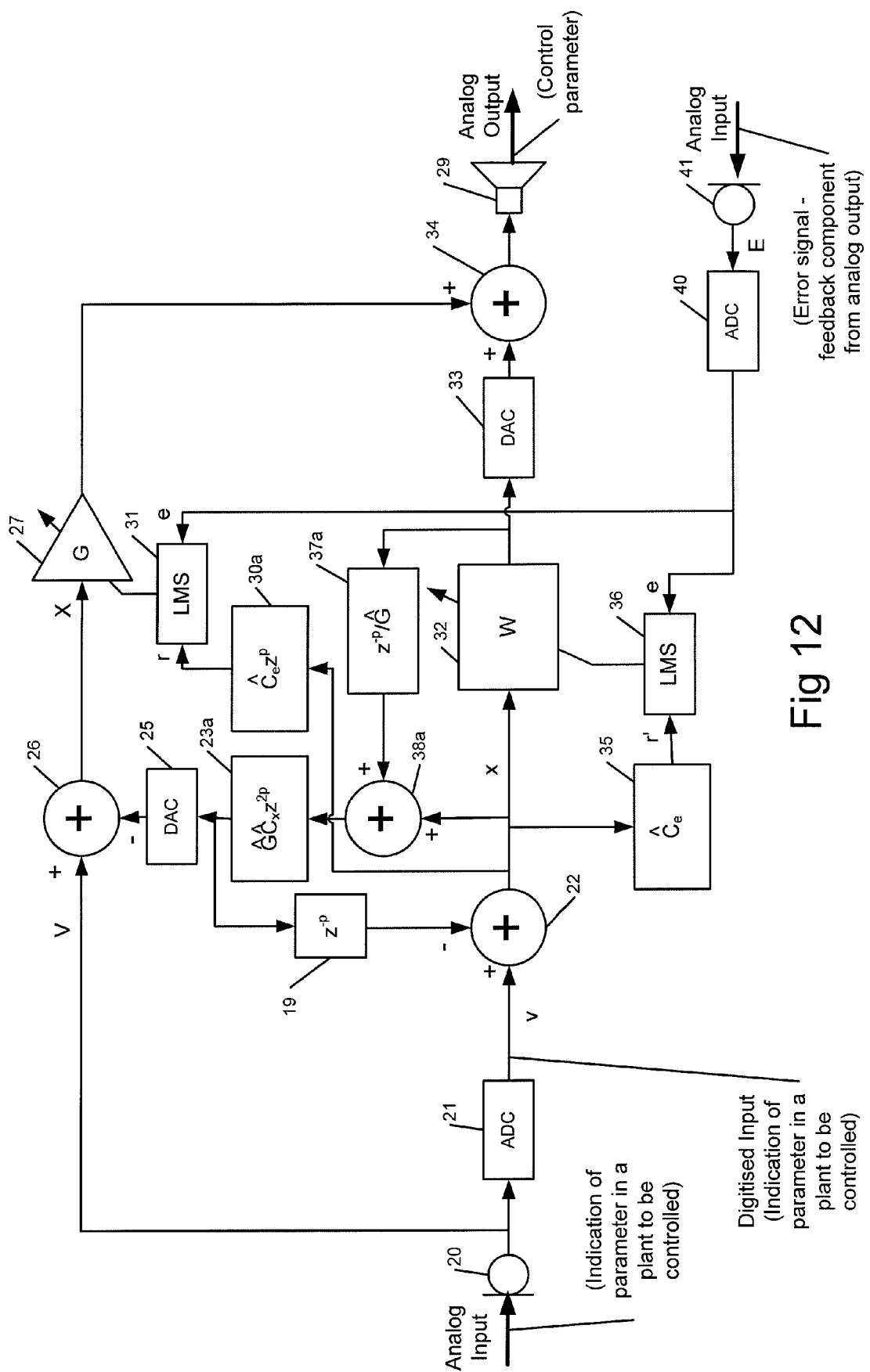
FIG. 12 is a schematic diagram of a feed forward hybrid analog and digital adaptive control system in accordance with a tenth embodiment of the present invention.

A tenth embodiment of the present invention will now be described with reference to FIG. 12. This embodiment of the present invention is a feedforward hybrid digital and analog adaptive control unit. This embodiment of the present invention is similar to the ninth embodiment of the present invention except that an error sensing microphone 41 is provided in the vicinity of the loudspeaker 29. The output of the error sensing microphone 41 is input to an analog-to-digital converter 40 and the digitized output signal e is input to the LMS algorithm 31 with the LMS algorithm 36.

Figure 13:
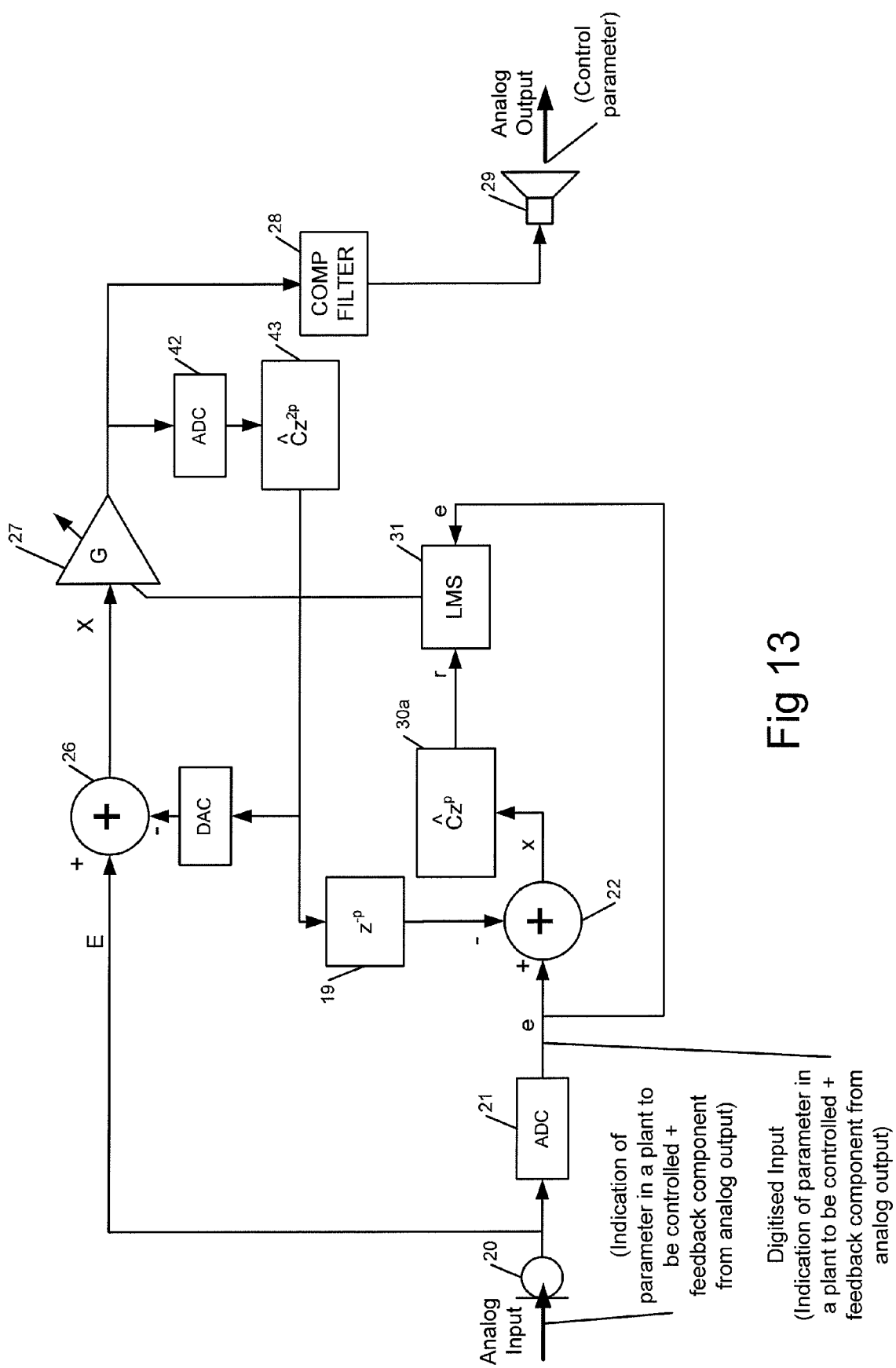
FIG. 13 is a schematic diagram of a virtual earth feedback analog adaptive control system in accordance with an eleventh embodiment of the present invention.

An eleventh embodiment of the present invention will now be described with reference to FIG. 13. This embodiment of the present invention comprises a virtual earth feedback analog adaptive control unit.

In this embodiment of the present invention, the compensation is provided for by using the output of the amplifier 27 and feeding it back to the analog subtractor 26 and the digital subtractor 22. In order to do this an additional analog-to-digital converter 42 is required to digitize the output of the amplifier 27. The output of the analog-to-digital converter 46 is input into a digital filter comprising a time advanced model of the acoustic system, i.e. $\hat{C}Z^m$. The time advancement by $Z^m$ is required in order to compensation for the delay caused by the digital-to-analog converter 25 in order to provide the analog compensation signal used by the analog subtractor 26. The output of the filter 43 is also fed back to the digital subtractor 22 for the generation of the regenerated reference x. The output of the digital subtractor 22 is input to a filter 30a comprising a time advanced model of the acoustic response of the system, i.e. $\hat{C}Z^m$ in order to generate the reference signal r for input to the LMS algorithm 31.

This embodiment of the present invention is similar to the first embodiment of the present invention except that the compensation signal is generated using the output of the amplifier 27 rather than the output of the ADC 21, i.e. the input to the adaptive control unit. This concept of using the output of the amplifier 27 to generate the compensation signal or subtraction by the analog subtractor 26, the digital subtractor 22, and the combined analog subtractor 26a is applicable to any of the previous embodiments described hereinabove. The benefit of this embodiment is that no model of the amplifier 27 is required. However, an additional analog-to-digital converter 42 is required in order to digitize the output of the amplifier 27.

Figure 14:
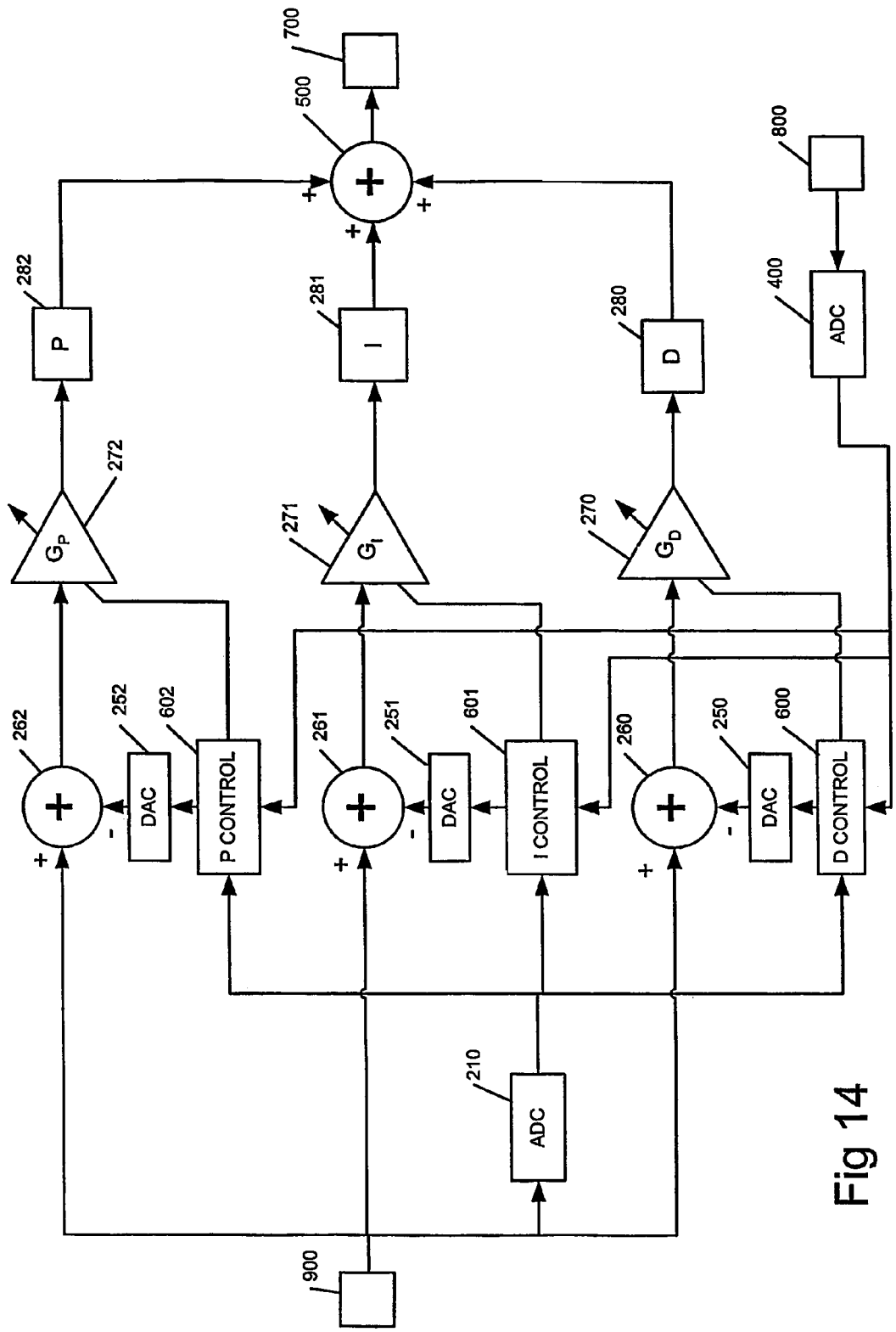
FIG. 14 is a schematic diagram of a PID controller incorporating three of the feed forward analog adaptive controllers of the fifth embodiment of the present invention.

A twelfth embodiment of the present invention will now be described with reference to FIG. 14. This embodiment of the present invention comprises a proportional, integral, differential (PID) controller comprising three control units of the embodiment of FIG. 7.

In this embodiment the parameter detector 900 detects the parameter to be controlled. The analog input is input into three subtractors 260, 261 and 262. The analog inputs also input to an analog-to-digital converter 210 and the output of the analog-to-digital converter 210 is input into respective controllers 600, 601 and 602 for control of the respective components DIP. Each controller 600, 601 and 602 comprises the components 22, 23, 24, 30 and 31 illustrated in FIG. 7. The compensation signal generated by each controller is output to a respective digital-to-analog converter 250, 251 and 252 and a respective analog compensation signal is subtracted by respective subtractors 260, 261 and 262 to generate a regenerated reference for input to a respective gain control unit 270, 271 and 272 for control of the gain for D, I and P components respectively. The output of the variable gain components 270, 271 and 272 are input to a differential unit 280 and integral unit 281 and a proportional unit 282 respectively. The output of these units is then combined in a combiner 500 and a combined output is output to a parameter actuator 700 for controller the parameter to be controlled. An error sensor 800 is provided to sense the error in the control and analog-to-digital converter 400 digitizes the output of the sensor 800 to provide an error feedback to the respective controllers 600, 601 and 602.

Thus in accordance with this embodiment of the present invention, each of the P, I and D components of a PID controller can be typically controlled using a feedforward technique. This is facilitated by the compensation for pollution of the reference signal from the reference sensor 900.

Although in embodiment 12 it is illustrated that the control units of the seventh embodiment are used for control of each of the components P, I and D, any analog feedforward control unit with feedback compensation can be used for control of the gain of each of the PID components. For example, either the fifth embodiment illustrated in FIG. 7 or the seventh embodiment illustrated in FIG. 9 can be used.

Figure 15:
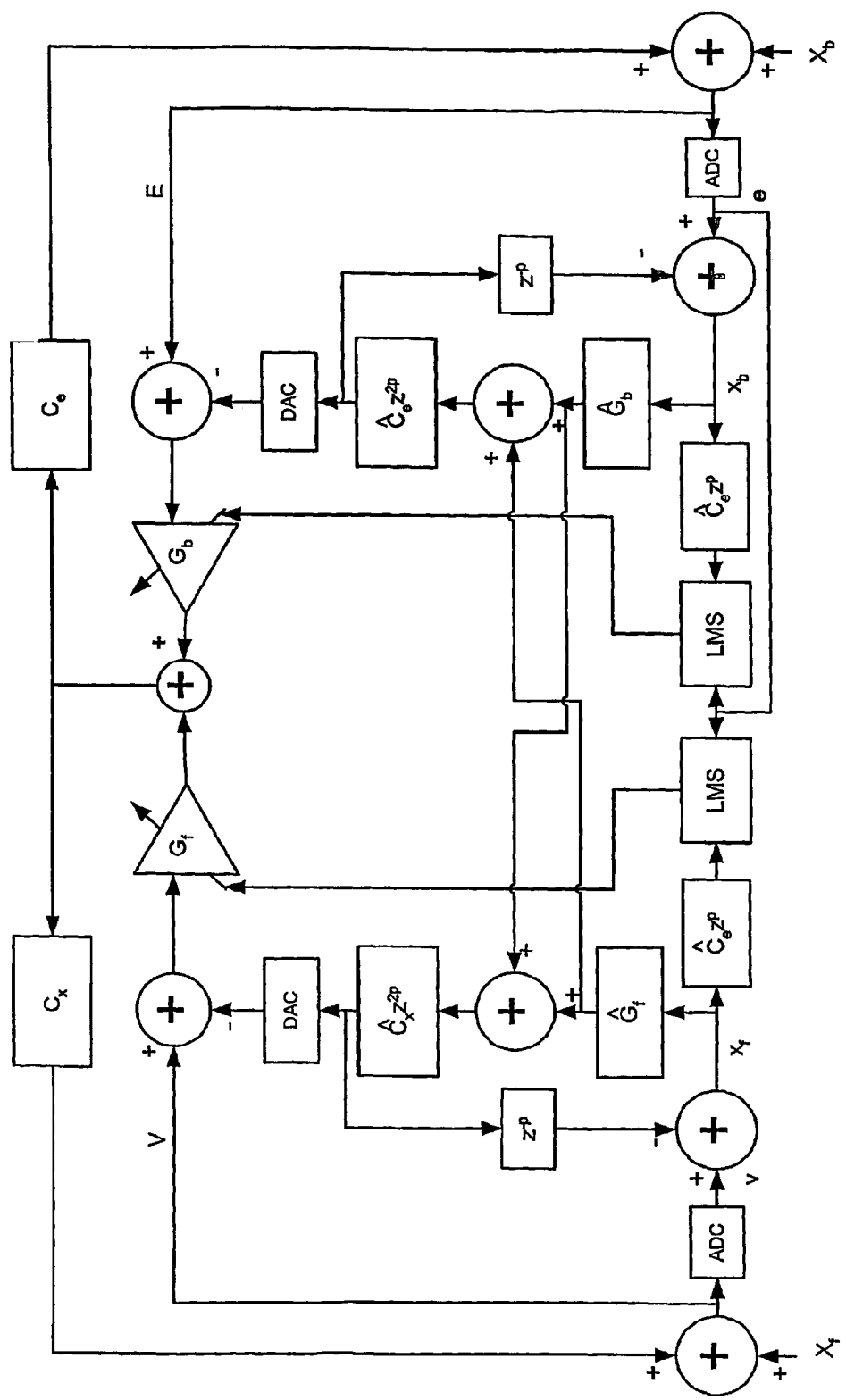
FIG. 15 is a schematic diagram of a combined feed forward and feedback analog control system with digital feed forward adaption in accordance with a thirteen embodiment of the present invention.

FIG. 15 illustrates a thirteenth embodiment of the present invention in which the feedback control system of the first embodiment and the feed forward control system of the fifth embodiment are combined to generate a combined output. The benefit of using a combined system is that the feedback system works to reduce the autocorrelation of the error and the feed forward system works to reduce the correlation of the reference and the error. Thus using both can provide an improved control system.

As can be seen in FIG. 15, the reference plant is denoted by $C_x$ and the error plant is denoted by $C_e$. The feed forward components are denoted with f. The feedback components are denoted with b. The feed forward components of FIG. 3 are arranged on the left and the feedback components of FIG. 7 are arranged on the right. The models $\hat{C}$ and $\hat{G}$ are switched in this embodiment for convenience so that $\hat{G}$ is positioned before $\hat{C}$ in the signal paths. The cross coupling between the two sides occurs using the outputs of $\hat{G}_b$ and $\hat{G}_f$. The outputs are summed and input to the two filter models $\hat{C}_x z^{2P}$ and $\hat{C}_e z^{2P}$.

Figure 16:
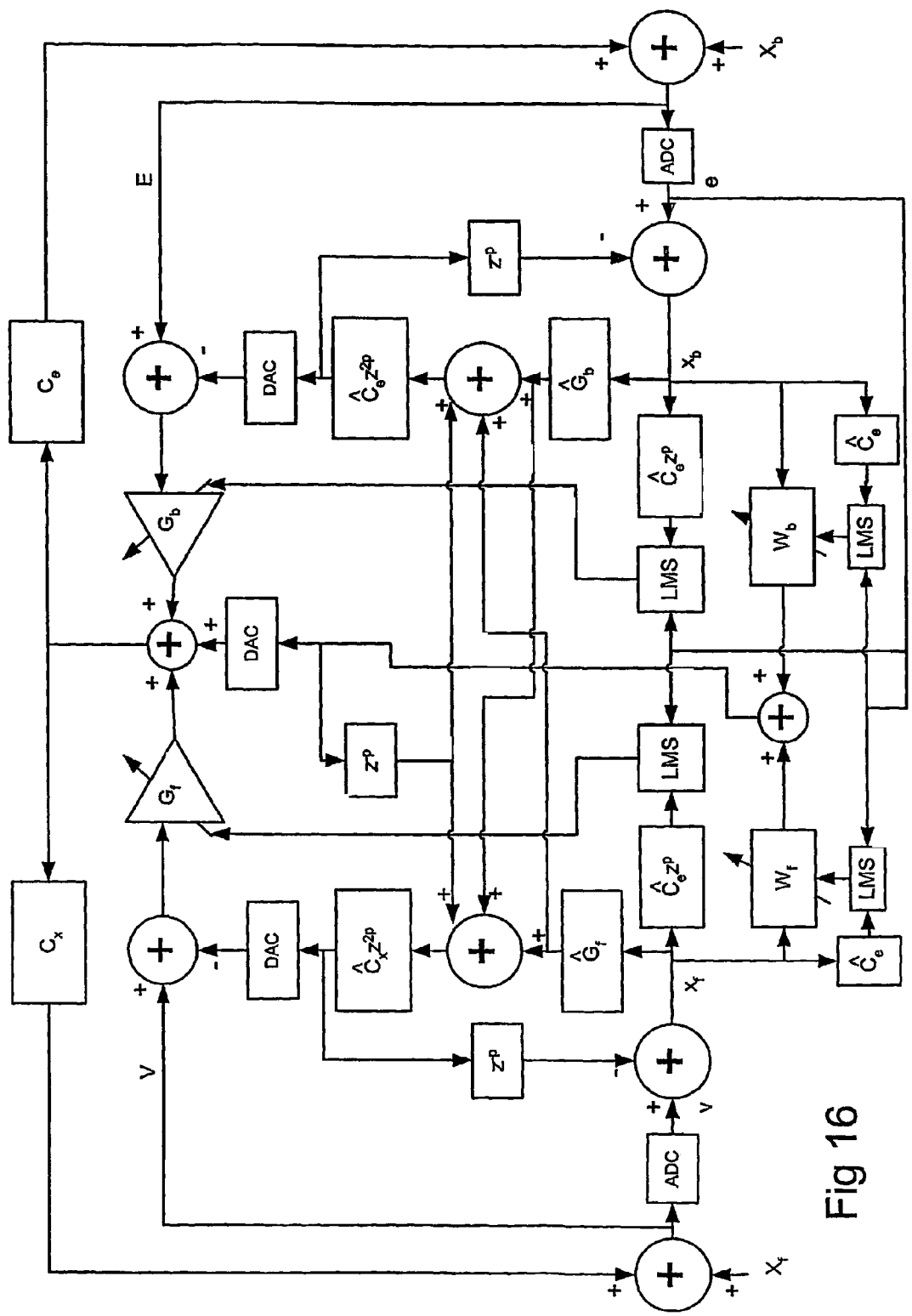
FIG. 16 is a schematic diagram of a combined feed forward and feedback analog and digital control system with digital feed forward adaption in accordance with a fourteenth embodiment of the present invention.

FIG. 16 illustrates a fourteenth embodiment of the present invention in which the feedback control system of the second embodiment and the feed forward control system of the sixth embodiment are combined to generate a combined output in a similar manner to the thirteenth embodiment.

Thus in one embodiment of the invention, two adaptive control units, one feed forward and one feedback can be combined to provide an improved adaptive controller using common inputs and outputs i.e. a reference input which is contaminated, an error input, and an output. The outputs can be combined electrically e.g to use a single transducer such as a loudspeaker, or physically e.g two transducers are used and the output is combined physically such as from two loudspeakers.

In summary, and with reference to FIG. 17, the present invention broadly describes an adaptive control unit for receiving an analog input signal containing at least an indication of a parameter to be controlled to generate an analog output signal for control of the parameter, wherein said analog input signal contains a fed back component resulting from said analog output signal, the adaptive control unit comprising: an analog input 51 for receiving said analog input signal and an analog output 52 for outputting said analog output signal; an analog filter 53 having an adjustable gain and connected between said analog input 51 and said analog output 52; a gain control unit 54 connected to said analog filter 53 for controlling the gain of said analog filter 53 using a feed forward adjustment method; and a feedback filter 55 connected to the input of said analog filter 53 for compensating for said fed back component in said analog input signal 51.

In any of the embodiments described hereinabove the control can be performed by any suitable digital control device such as a programmable logic device, or a dedicated hardware device.

The model $\hat{C}$ of the plant can be adaptively learnt using known techniques such as by the injection of white noise into the system and the adaptive learning of the adaptive filter coefficients for $\hat{C}$.

The present invention is applicable to the control of any parameters and is not restricted to the control of acoustic vibrations. For example, the present invention is applicable to the control of any physical parameters such as acoustic, optical, electrical, thermal or magnetic parameter and thus the microphones 20, 41, and 200 can comprise any suitable parameter sensor and the loudspeaker 29 and 290 can comprise any suitable parameter actuator. Where the parameter is electrical, no parameter sensor or actuator may be required.

Although the present invention has been described hereinabove with reference to specific embodiments, it will be apparent to a skilled person in the art that modifications lie within the spirit and scope of the present invention.

The invention claimed is:

1. An adaptive control unit for receiving an analog input signal containing at least an indication of a parameter in a plant to be controlled to generate an analog output signal for control of the parameter, wherein said analog input signal contains a fed back component resulting from said analog output signal, the adaptive control unit comprising:
an analog filter having an adjustable gain;
gain adjusting means for adjusting the gain of said analog filter; and
filtering means connected to an input of said analog filter and configured to compensate for said fed back component in said analog input signal; wherein said gain adjustment means is adapted to determine a gain adjustment using a digital feed forward adjustment method, said digital feed forward adjustment method including the step of digitally processing the input signal using a model of the plant;
wherein said filtering means is configured to filter using a model of at least a phase response of a feedback path of said analog output signal to said analog input signal.

2. An adaptive control unit according to claim 1, wherein said gain adjustment means is adapted to determine said gain adjustment using a digitized version of said indication of said parameter in said analog input signal and an error component.

3. An adaptive control unit according to claim 2, wherein said gain adjustment means is adapted to use a digitized version of said analog input signal after filtering by said filtering means.

4. An adaptive control unit according to claim 2, wherein said gain adjustment means is adapted to use a digitized version of said analog input signal to provide said error component.

5. An adaptive control unit according to claim 2, wherein said gain adjustment means is adapted to use an error signal input to provide said error component.

6. An adaptive control unit according to claim 1, wherein said gain adjustment means is adapted to use a filtered reference signal method.

7. An adaptive control unit according to claim 1, including analog subtractor means for subtracting an output of said filtering means from said analog input signal input before input to said analog filter.

8. An adaptive control unit according to claim 1, wherein said filtering means is adapted to filter said analog input signal.

9. An adaptive control unit according to claim 8, wherein said filtering means is adapted to filter said analog input signal using a model of at least a phase response of said analog filter.

10. An adaptive control unit according to claim 8, including analog subtractor means for subtracting an output of said filtering means from said analog input signal input before input to said analog filter.

11. An adaptive control unit according to claim 10, wherein said filtering means is adapted to receive said analog input signal for filtering after subtraction of the filtered signal by said subtractor means.

12. An adaptive control unit according to claim 8, wherein said filtering means comprises a digital filter.

13. An adaptive control unit according to claim 8, wherein said filtering means comprises a digital filter and a digital subtractor means for digitally subtracting a digital representation of said analog output signal from a digital representation of said analog input signal.

14. An adaptive control unit according to claim 12, wherein said digital filter is adapted to filter using a model of at least a phase response of a feedback path of said analog output signal to said analog input signal and said digital filter is adapted to include a factor in said model compensating for a delay caused by analog to digital conversion of said analog input signal and digital to analog conversion of a digital result of digitally filtering.

15. An adaptive control unit according to claim 8, wherein said filtering means includes an analog to digital converter for receiving and digitising the analog input signal, at least one digital filter for filtering the digitised input signal, and a digital to analog converter for converting the filtered digitised input signal to produce an analog compensation signal for compensating for feedback of said analog output signal in said analog input signal.

16. An adaptive control unit according to claim 1, wherein said filtering means is adapted to filter said analog output signal.

17. An adaptive control unit according to claim 16, wherein said filtering means is adapted to filter using a model of at least a phase response of a feedback path of said analog output signal to said analog input signal.

18. An adaptive control unit according to claim 16, including analog subtractor means for subtracting an output of said filtering means from said analog input signal input before input to said analog filter.

19. An adaptive control unit according to claim 16, wherein said filtering means comprises a digital filter.

20. An adaptive control unit according to claim 19, wherein said digital filter is adapted to include a factor in said model compensating for the delay caused by analog to digital conversion of said analog output signal and digital to analog conversion of a digital result of digitally filtering.

21. An adaptive control unit according to claim 16, wherein said filtering means includes an analog to digital converter for receiving and digitising the analog input signal, at least one digital filter for filtering the digitised input signal, and a digital to analog converter for converting the filtered digitised input signal to produce an analog compensation signal for compensating for any feedback of said analog output signal in said analog input signal.

22. An adaptive control unit according to claim 1, wherein said gain adjusting means comprises a digital control means.

23. An adaptive control unit according to claim 22, wherein said digital control means comprises a filtered reference control means.

24. An adaptive control unit according to claim 1, wherein said analog filter comprises an amplifier.

25. An adaptive control unit according to claim 24, wherein said amplifier comprises a digitally controlled amplifier.

26. An adaptive control unit according to claim 1, wherein said analog filter comprises an analog compensation filter.

27. An adaptive control unit according to claim 1, wherein said filtering means and said gain adjusting means comprises a programmed digital controller.

28. An adaptive control unit according to claim 1, wherein said filtering means comprises a one bit analog to digital converter for converting the analog signal to a one bit digital signal, a digital filter comprising a model of the feedback path of said analog output signal to said analog input signal and adapted to digitally filter the one bit digital signal by a series of additions, and a one bit digital to analog converter for converting the output of said digital filter to an analog filter output for use in the compensation for said fed back component in said analog input signal.

29. An adaptive control unit according to claim 1, including a digital filter unit for digitally filtering said analog input signal; and a combiner means for combining the output of said analog filter and the output of said digital filter unit to provide said analog output signal for said control unit.

30. An adaptive control unit according to claim 29, wherein said digital filter unit is an adaptive digital filter.

31. An adaptive control unit according to claim 29, wherein said digital filter unit is controllable to be adapted using a filtered reference method.

32. An adaptive control unit according to claim 30, wherein said adaptive digital filter includes feedback compensation for compensating for a fed back component from an output of said digital adaptive filter in said analog input signal.

33. An adaptive control unit according to claim 1, for receiving a plurality of said analog input signals each containing at least an indication of the parameter to be controlled to generate a plurality of said analog output signals for control of the parameter, wherein each said analog input signal contains a fed back component resulting from each said analog output signal, the adaptive control unit further comprising a plurality of said analog filters, each having an adjustable gain; wherein said gain adjusting means is adapted to adjust the gain of each said analog filter using a feed forward adjustment method; and said filtering means is adapted to compensate for said fed back component in each said analog input signal.

34. An adaptive control unit according to claim 33, wherein said gain adjusting means is adapted to use a multi-channel filtered reference method for adjustment of said gain for each said analog filter.

35. An adaptive control unit for receiving an analog input signal containing at least an indication of a parameter in a plant to be controlled to generate an analog output signal for control of the parameter, wherein said analog input signal contains a fed back component resulting from said analog output signal, the adaptive control unit comprising:

an analog input for receiving said analog input signal and an analog output for outputting said analog output signal;

an analog filter having an adjustable gain and connected between said analog input and said analog output;

a gain control unit connected to said analog filter for controlling the gain of said analog filter using a digital feed forward adjustment method, said digital feed forward adjustment method including the step of digitally processing the analog input signal using a model of the plant; and a feedback filter connected to the input of said analog filter and configured to compensate for said fed back component in said analog input signal;

wherein said feedback filter is configured to filter using a model of at least a phase response of a feedback path of said analog output signal to said analog input signal.

36. An adaptive control unit according to claim 35, wherein said gain control unit is adapted to determine said gain adjustment using a digitized version of said indication of said parameter in said analog input signal and an error component.

37. An adaptive control unit according to claim 36, wherein said gain control unit is adapted to use a digitized version of said analog input signal after filtering by said feedback filter.

38. An adaptive control unit according to claim 36, wherein said gain control unit is adapted to use a digitized version of said analog input signal to provide said error component.

39. An adaptive control unit according to claim 36, wherein said gain control unit is adapted to use an error signal input to provide said error component.

40. An adaptive control unit according to claim 35, wherein said gain control unit is adapted to use a filtered reference signal method.

41. An adaptive control unit according to claim 35, including an analog subtractor circuit for subtracting an output of said feedback filter from said analog input signal input before input to said analog filter.

42. An adaptive control unit according to claim 35, wherein said feedback filter is adapted to filter said analog input signal.

43. An adaptive control unit according to claim 42, wherein said feedback filter is adapted to filter said analog input signal using a model of at least a phase response of said analog filter.

44. An adaptive control unit according to claim 42, including an analog subtractor circuit for subtracting an output of said feedback filter from said analog input signal input before input to said analog filter.

45. An adaptive control unit according to claim 44, wherein said feedback filter is adapted to receive said analog input signal for filtering after subtraction of the filtered signal by said subtractor circuit.

46. An adaptive control unit according to claim 42, wherein said feedback filter comprises a digital filter.

47. An adaptive control unit according to claim 42, wherein said feedback filter comprises a digital filter and a digital subtractor circuit for digitally subtracting a digital representation of said analog output signal from a digital representation of said analog input signal.

48. An adaptive control unit according to claim 46, wherein said digital filter is adapted to filter using a model of at least a phase response of a feedback path of said analog output signal to said analog input signal and said digital filter is adapted to include a factor in said model compensating for a delay caused by analog to digital conversion of said analog input signal and digital to analog conversion of a digital result of digitally filtering.

49. An adaptive control unit according to claim 42, wherein said feedback filter includes an analog to digital converter for receiving and digitising the analog input signal, at least one digital filter for filtering the digitised input signal, and a digital to analog converter for converting the filtered digitised input signal to produce an analog compensation signal for compensating for feedback of said analog output signal in said analog input signal.

50. An adaptive control unit according to claim 35, wherein said feedback filter is adapted to filter said analog output signal.

51. An adaptive control unit according to claim 50, wherein said feedback filter is adapted to filter using a model of at least a phase response of a feedback path of said analog output signal to said analog input signal.

52. An adaptive control unit according to claim 50, including an analog subtractor circuit for subtracting an output of said feedback filter from said analog input signal input before input to said analog filter.

53. An adaptive control unit according to claim 50, wherein said feedback filter comprises a digital filter.

54. An adaptive control unit according to claim 53, wherein said digital filter is adapted to include a factor in said model compensating for the delay caused by analog to digital conversion of said analog output signal and digital to analog conversion of a digital result of digitally filtering.

55. An adaptive control unit according to claim 50, wherein said feedback filter includes an analog to digital converter for receiving and digitising the analog input signal, at least one digital filter for filtering the digitised input signal, and a digital to analog converter for converting the filtered digitised input signal to produce an analog compensation signal for compensating for any feedback of said analog output signal in said analog input signal.

56. An adaptive control unit according to claim 35, wherein said gain control unit comprises a digital control circuit.

57. An adaptive control unit according to claim 56, wherein said digital control circuit comprises a filtered reference control circuit.

58. An adaptive control unit according to claim 35, wherein said analog filter comprises an amplifier.

59. An adaptive control unit according to claim 58, wherein said amplifier comprises a digitally controlled amplifier.

60. An adaptive control unit according to claim 35, wherein said analog filter comprises an analog compensation filter.

61. An adaptive control unit according to claim 35, wherein said feedback filter and said gain control unit comprises a programmed digital controller.

62. An adaptive control unit according to claim 35, wherein said feedback filter comprises a one bit analog to digital converter for converting the analog signal to a one bit digital signal, a digital filter comprising a model of the feedback path of said analog output signal to said analog input signal and adapted to digitally filter the one bit digital signal by a series of additions, and a one bit digital to analog converter for converting the output of said digital filter to an analog filter output for use in the compensation for said fed back component in said analog input signal.

63. An adaptive control unit according to claim 35, including a digital filter unit for digitally filtering said analog input signal; and a combiner circuit for combining the output of said analog filter and the output of said digital filter unit to provide said analog output signal for said control unit.

64. An adaptive control unit according to claim 63, wherein said digital filter unit is an adaptive digital filter.

65. An adaptive control unit according to claim 63, wherein said digital filter unit is controllable to be adapted using a filtered reference method.

66. An adaptive control unit according to claim 64, wherein said adaptive digital filter includes feedback compensation for compensating for a fed back component from an output of said digital adaptive filter in said analog input signal.

67. An adaptive control unit according to claim 35, for receiving a plurality of said analog input signals each containing at least an indication of the parameter to be controlled to generate a plurality of said analog output signals for control of the parameter, wherein each said analog input signal contains a fed back component resulting from each said analog output signal, the adaptive control unit further comprising a plurality of said analog filters, each having an adjustable gain; wherein said gain control unit is adapted to adjust the gain of each said analog filter using a feed forward adjustment method; and said feedback filter is adapted to compensate for said fed back component in each said analog input signal.

68. An adaptive control unit according to claim 67, wherein said gain control unit is adapted to use a multi-channel filtered reference method for adjustment of said gain for each said analog filter.

* * * * *